C. C. TRAVIS.
MACHINE FOR SHAPING AND DIPPING LIGHT MANTLES.
APPLICATION FILED OCT. 9, 1906.
916,506.
Patented Mar. 30, 1909.
10 SHEETS—SHEET 1.
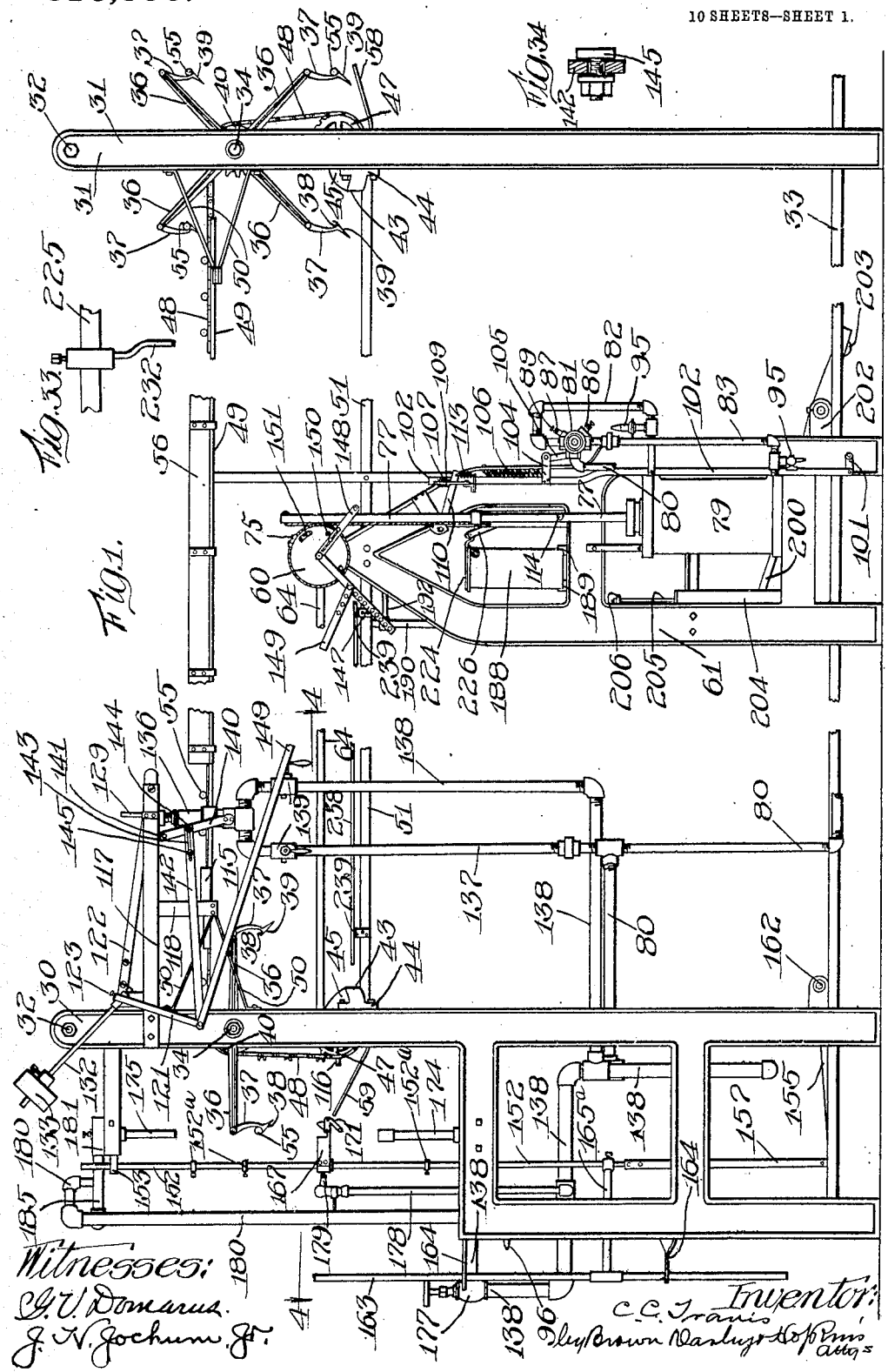

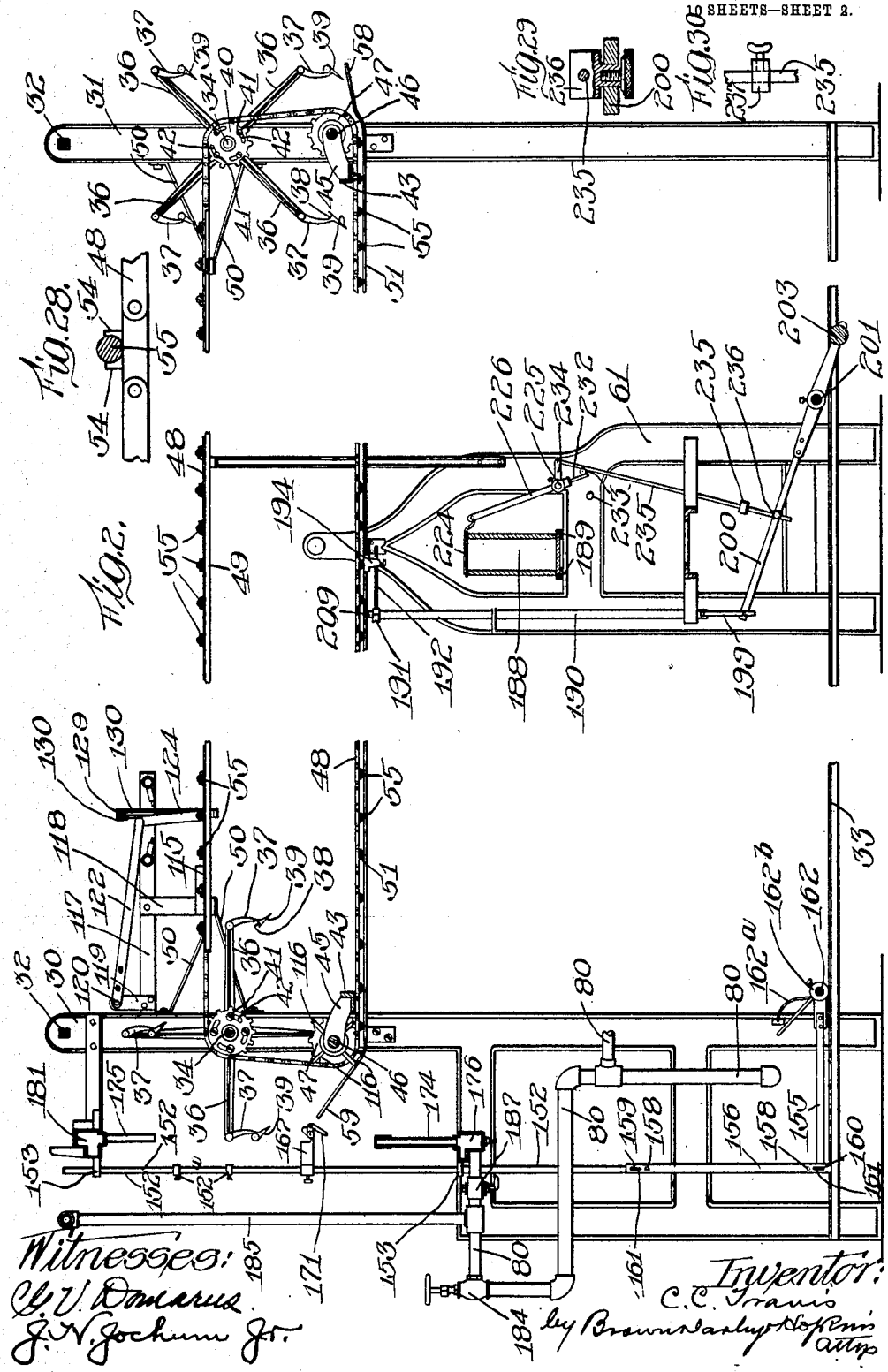

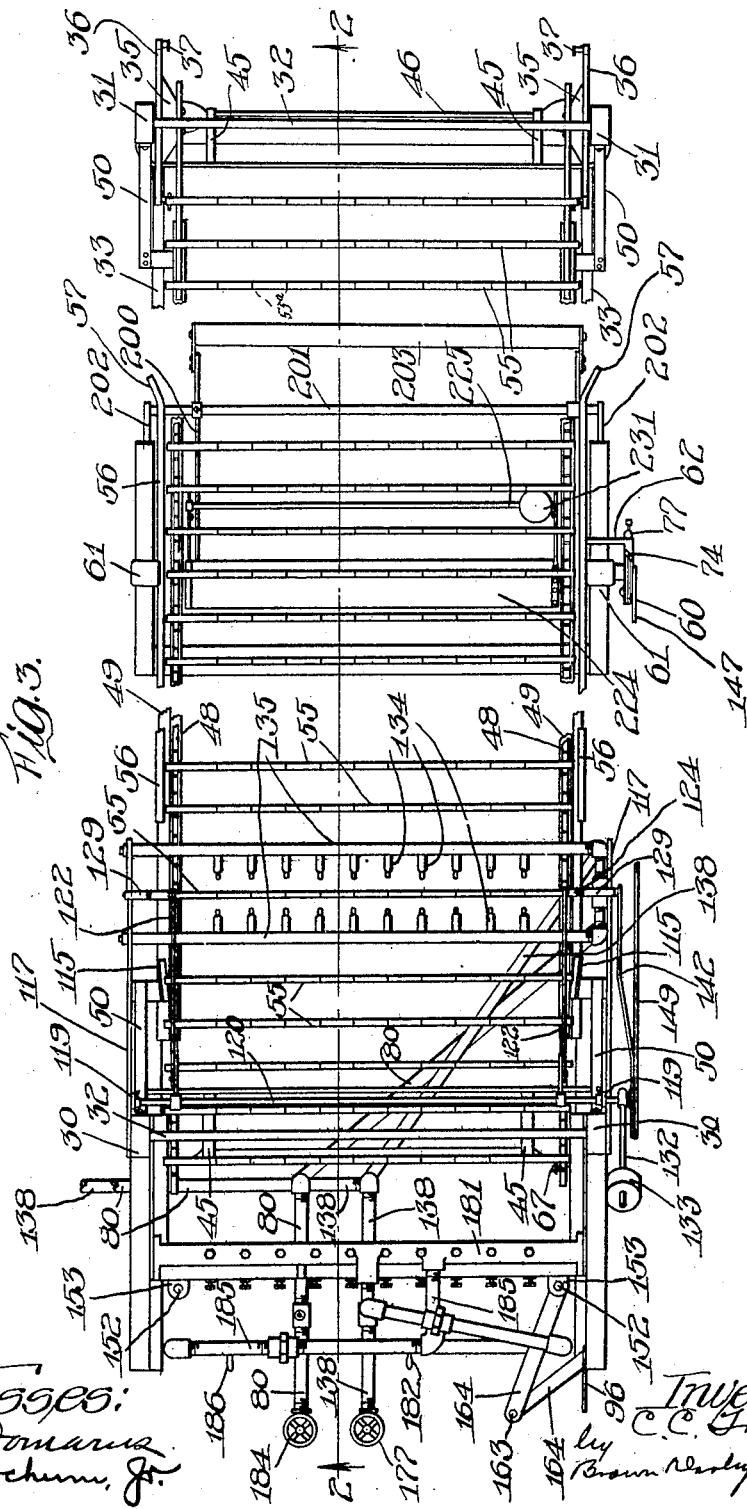

C. C. TRAVIS.
MACHINE FOR SHAPING AND DIPPING LIGHT MANTLES.
APPLICATION FILED OCT. 9, 1906.
916,506.
Patented Mar. 30, 1909.
10 SHEETS—SHEET 4.
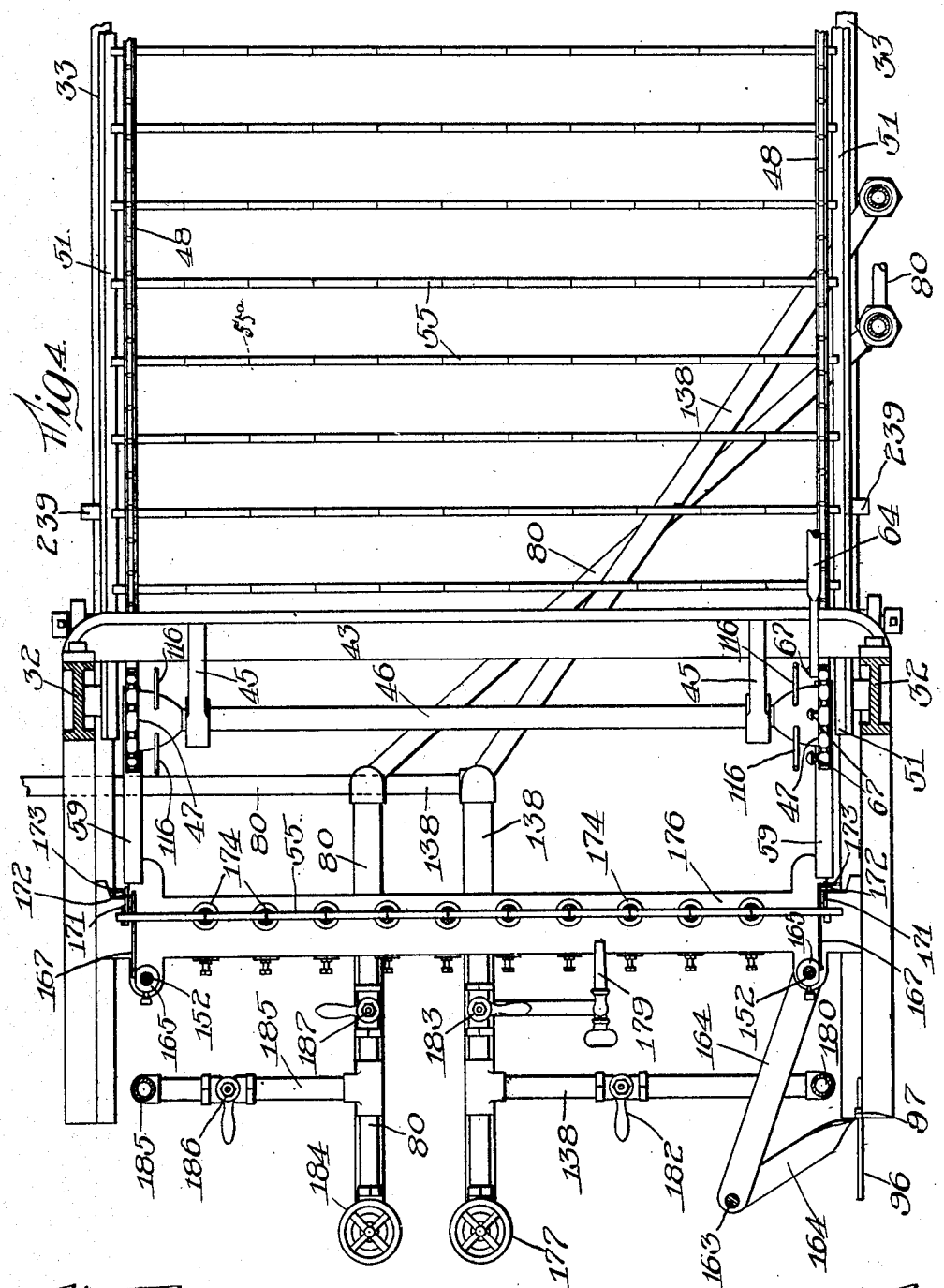

C. C. TRAVIS.
MACHINE FOR SHAPING AND DIPPING LIGHT MANTLES.
APPLICATION FILED OCT. 9, 1906.
916,506.
Patented Mar. 30, 1909.
10 SHEETS—SHEET 5.
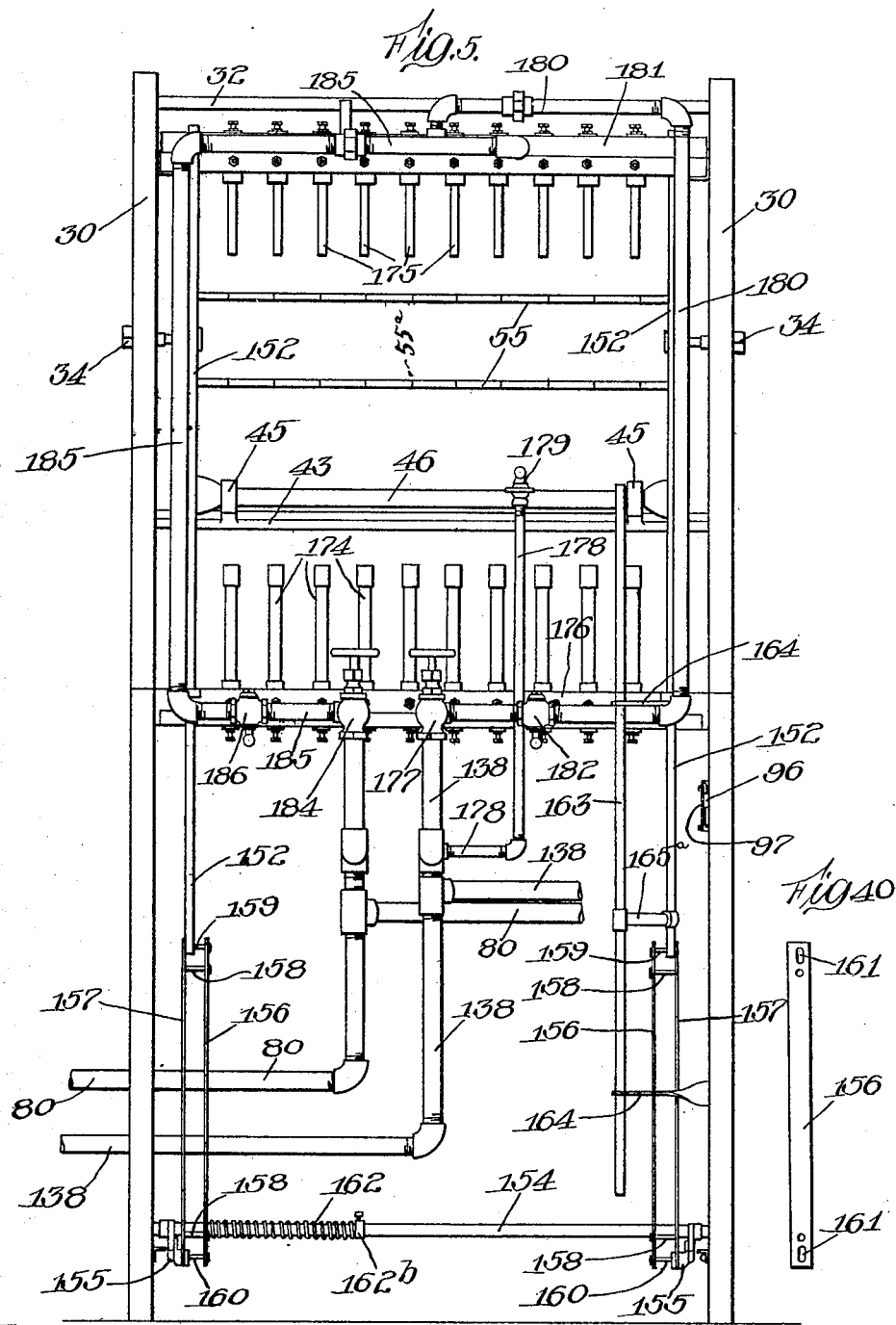

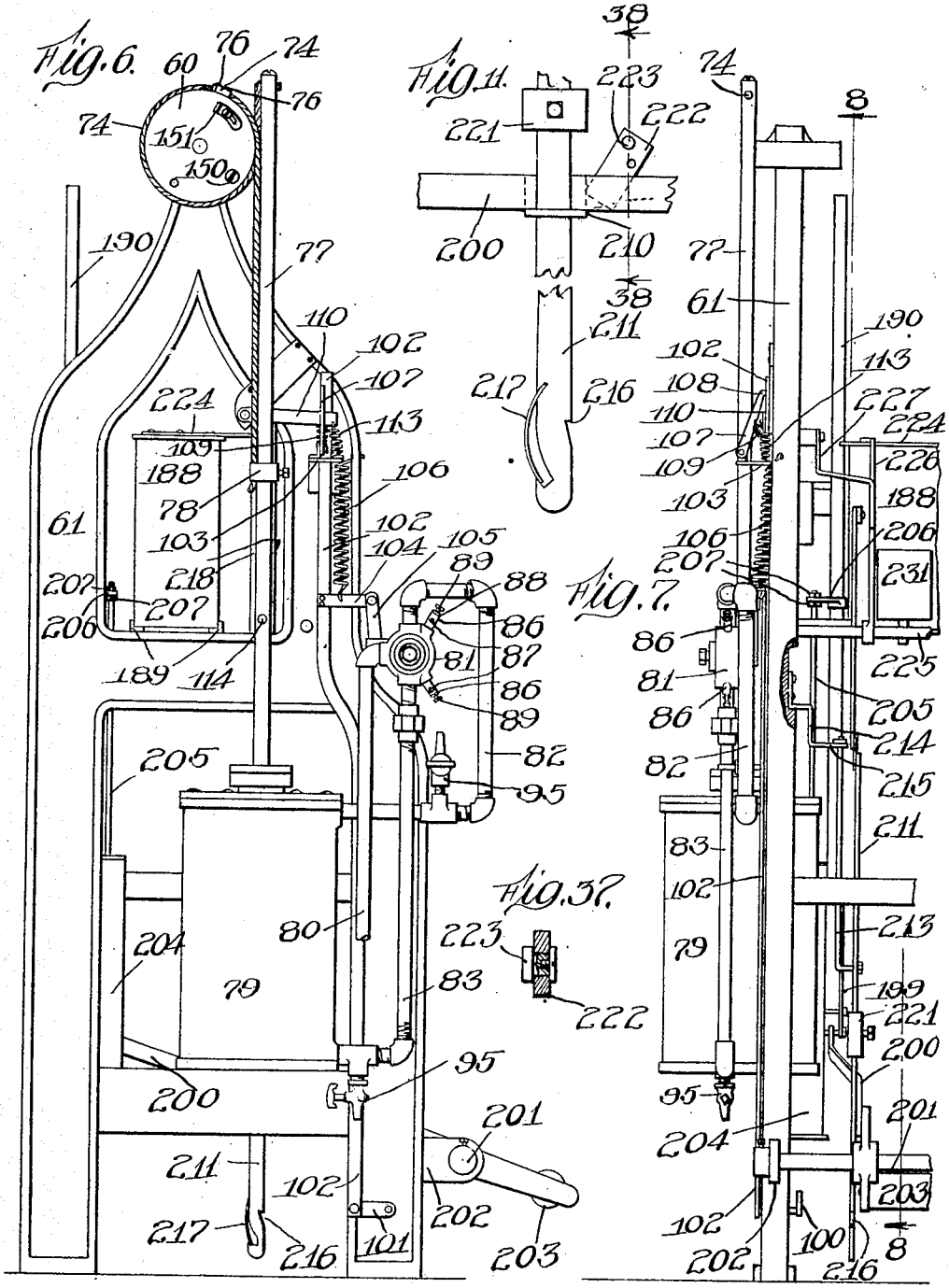

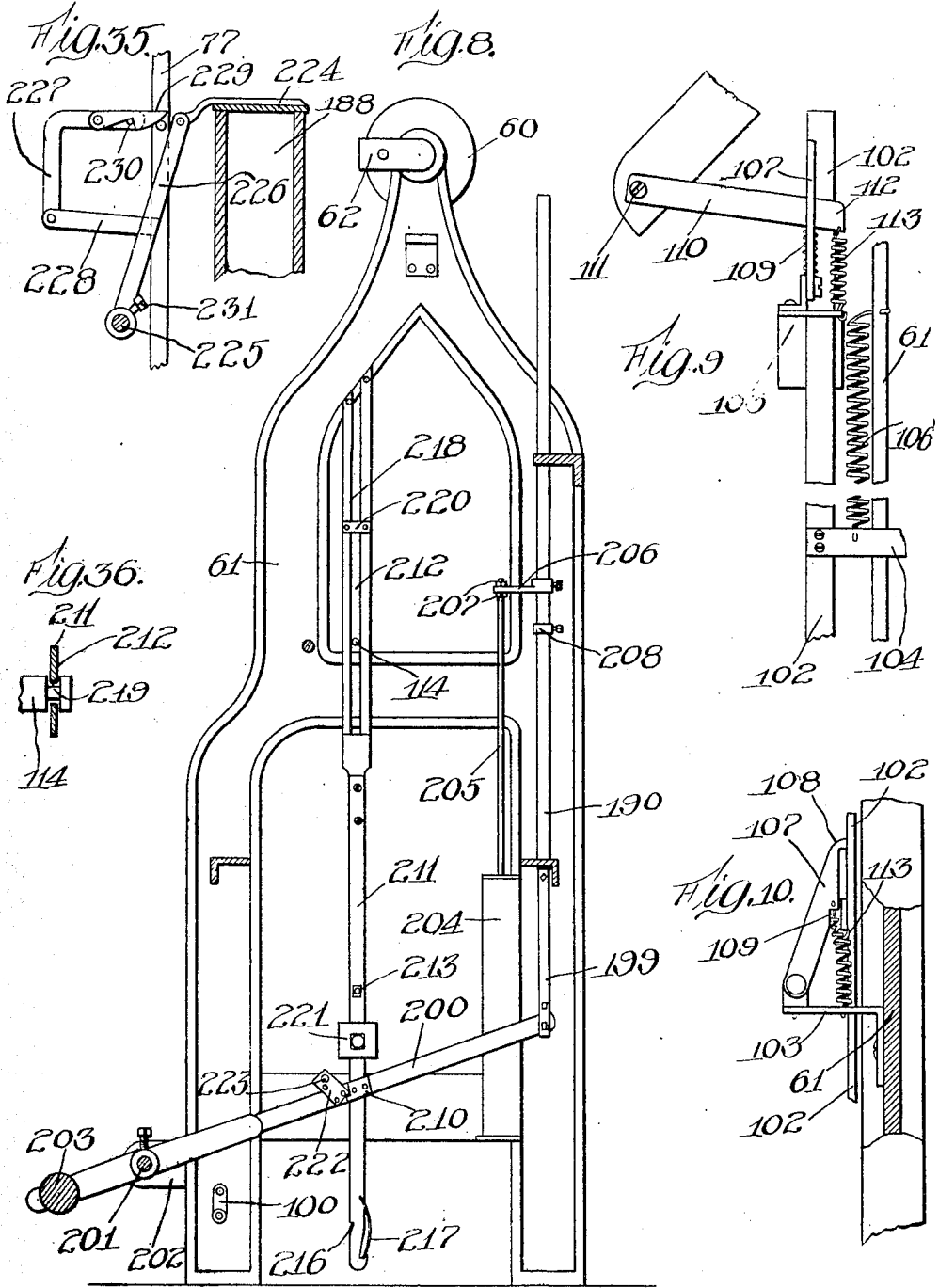

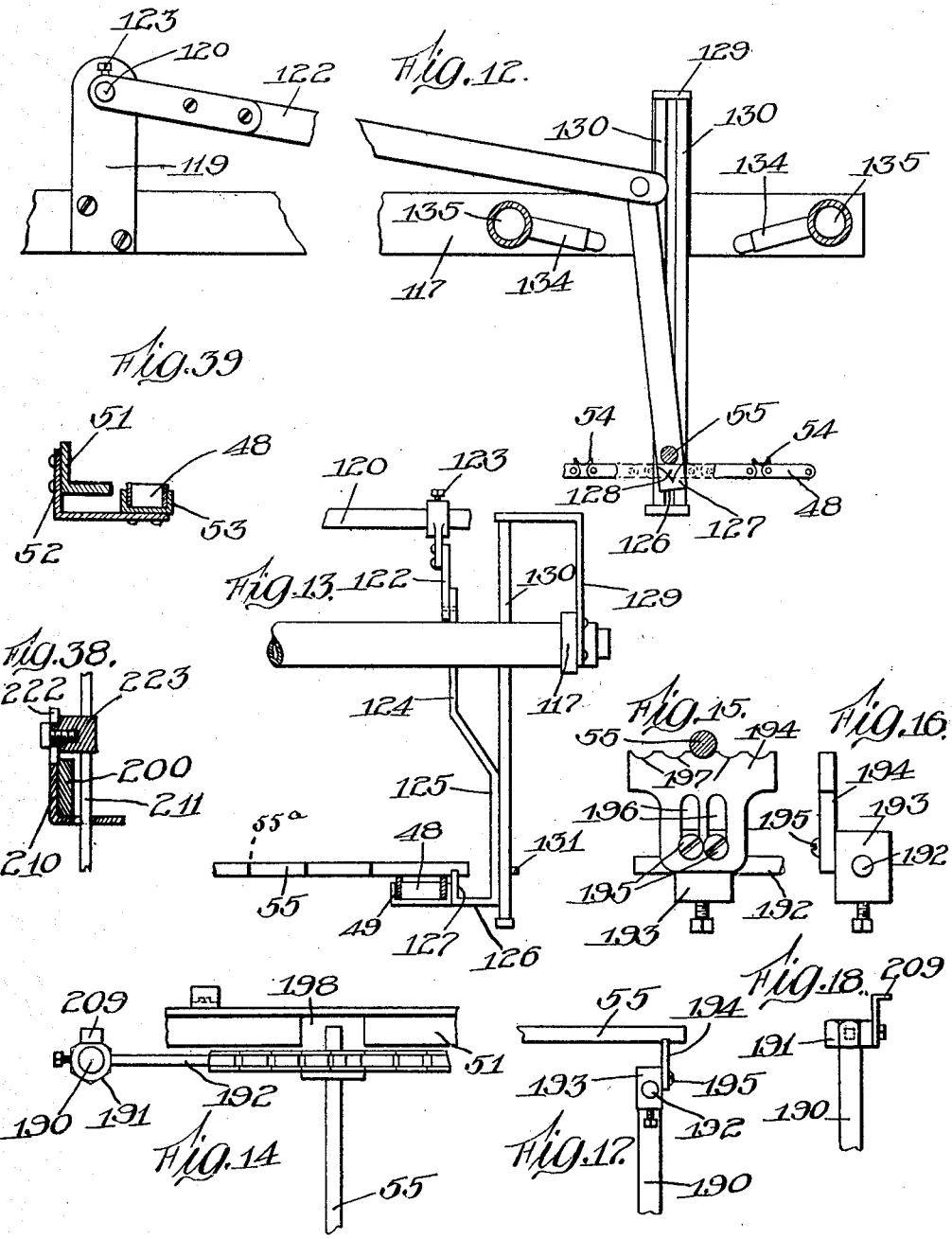

C. C. TRAVIS.
MACHINE FOR SHAPING AND DIPPING LIGHT MANTLES.
APPLICATION FILED OCT. 9, 1906.
916,506.
Patented Mar. 30, 1909.
10 SHEETS—SHEET 9.
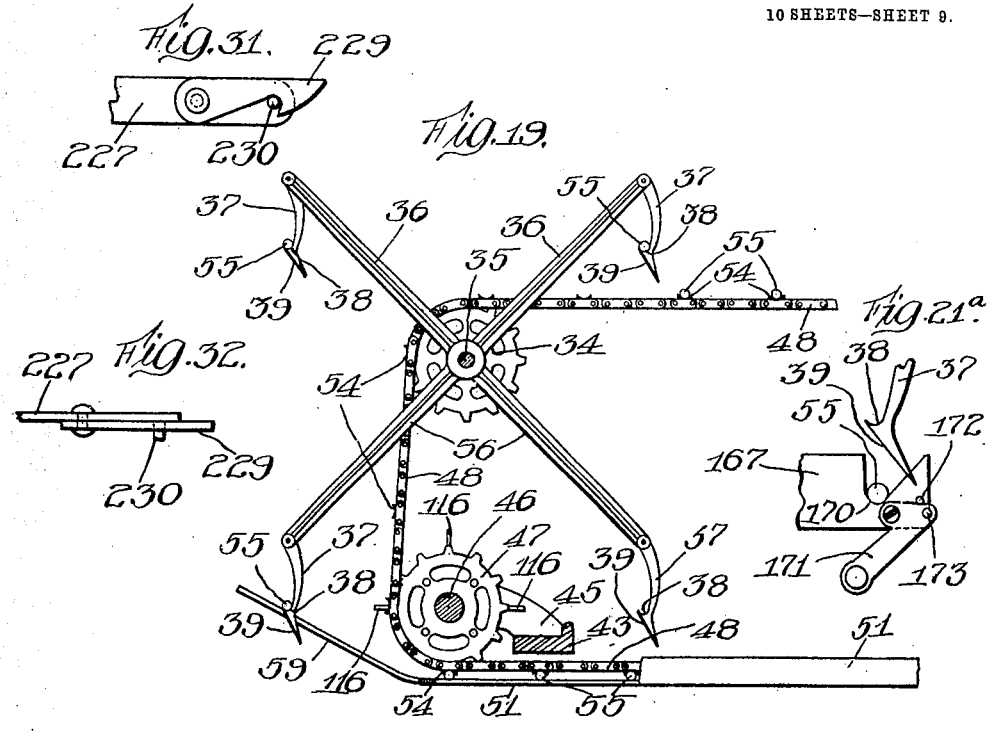
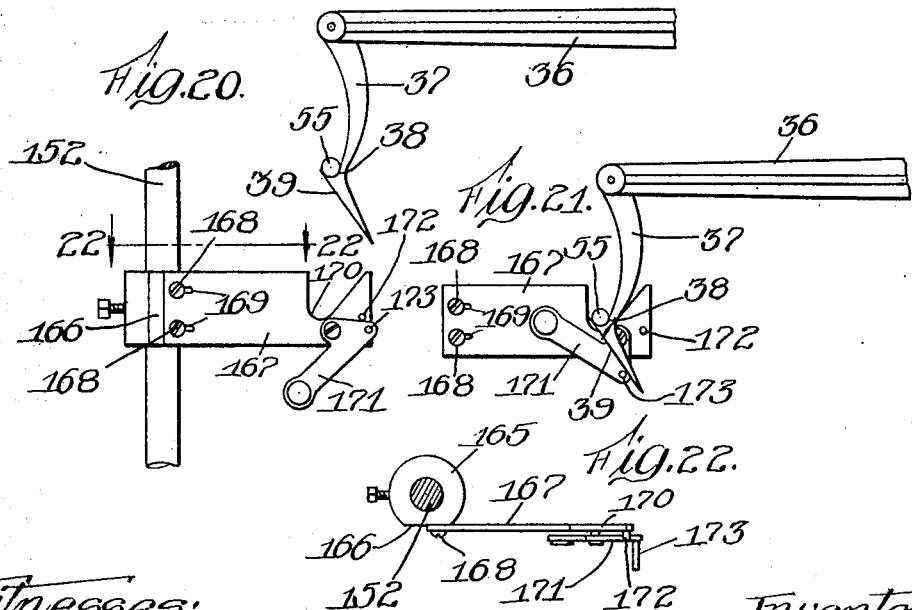
Witnesses:
Inventor:
C. C. Travis

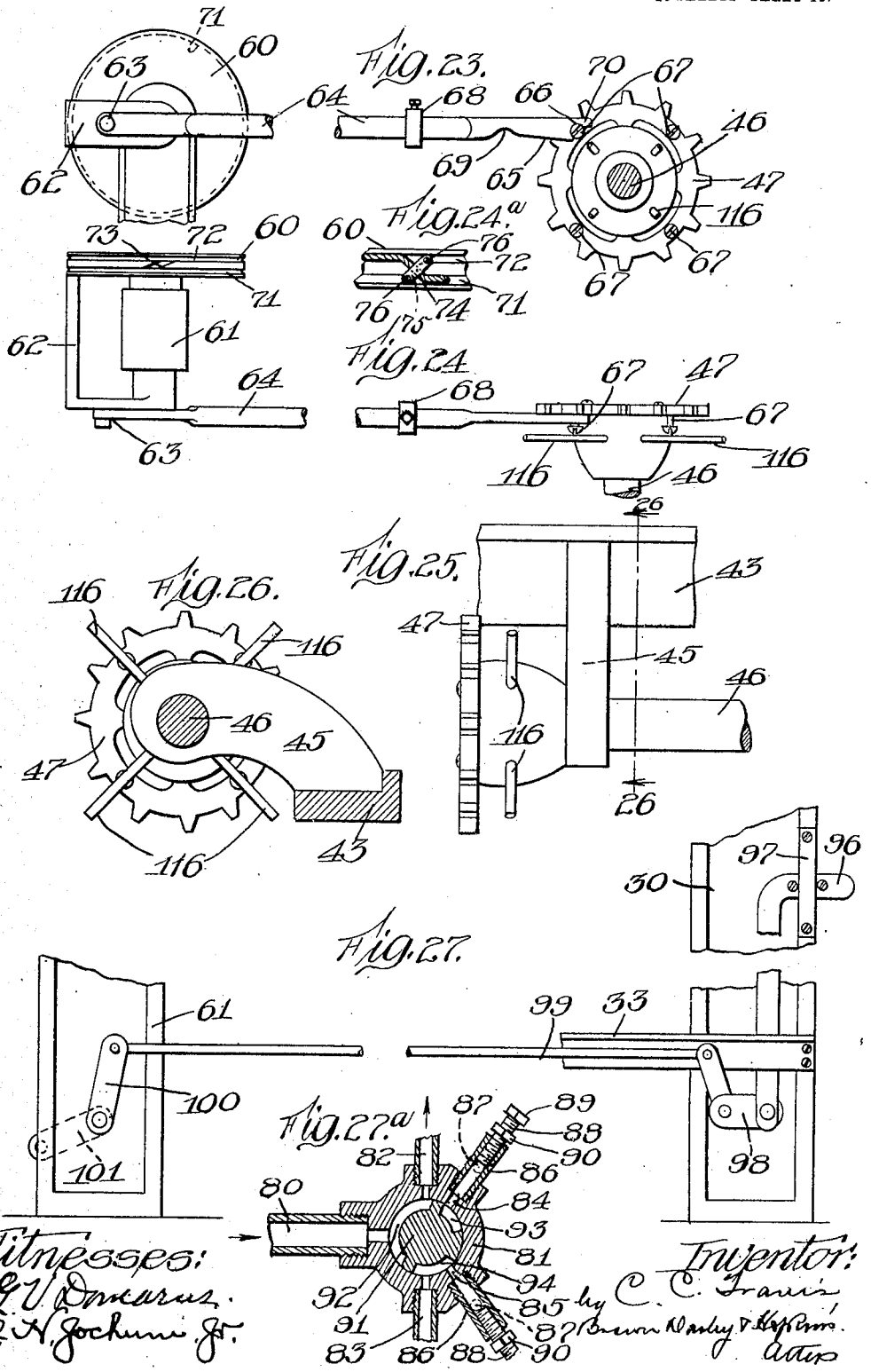

UNITED STATES PATENT OFFICE.

CLARENCE C. TRAVIS, OF CHICAGO, ILLINOIS.

MACHINE FOR SHAPING AND DIPPING LIGHT-MANTLES.

No. 916,506.      Specification of Letters Patent.      Patented March 30, 1909.

Application filed October 9, 1906. Serial No. 338,176.

*To all whom it may concern:*

Be it known that I, CLARENCE C. TRAVIS, a citizen of the United States, residing at Chicago, in the county of Cook and State of Illinois, have invented certain new and useful Improvements in Machines for Shaping and Dipping Light-Mantles, of which the following is a full, clear, and exact specification.

This invention relates to improvements in machines for shaping and dipping light mantles, and it has for its primary object to provide improved means for conveying the mantles to the shaping flame and for dipping the mantles in a preserving solution after they have been shaped.

A further object is to provide an improved machine of this character, which will be simple and cheap in construction and effective in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating an exemplification of the invention, and in which,—

Figure 1 is a broken side elevation of a machine constructed in accordance with the principles of this invention. Fig. 2 is a longitudinal sectional view on line 2—2 of Fig. 3. Fig. 3 is a top plan view of the machine shown in Fig. 1. Fig. 4 is a sectional view on line 4—4 of Fig. 1, looking in the direction of the arrows. Fig. 5 is a front elevation of the machine partly broken away and with parts removed. Fig. 6 is an elevation of a portion of the frame, the operating cylinder, and dipping tank. Fig. 7 is a side elevation of Fig. 6. Fig. 8 is a view on line 8—8 of Fig. 7. Fig. 9 is an enlarged detail view of valve locking mechanism. Fig. 10 is a side elevation of Fig. 9. Fig. 11 is a detail view of a portion of the weighted member for operating the dipping mechanism and the trip for said member. Fig. 12 is an enlarged detail view of the means for raising the mantles to the burners for burning out the cotton before shaping. Fig. 13 is an end elevation of Fig. 12. Fig. 14 is a detail plan view of a portion of the mantle conveyer and track and the means for lowering the mantles into the dipping tank. Fig. 15 is a side elevation of the mantle support holder on the dipping mechanism. Fig. 16 is an end elevation of Fig. 15. Fig. 17 is a view similar to Fig. 16, with a mantle support in position thereon. Fig. 18 is a detail view of a portion of the dipping mechanism showing the stop for limiting the upward movement thereof. Fig. 19 is an enlarged elevation of the conveyer lifting reel or arms and a portion of the conveyer. Fig. 20 is a detail view in elevation of the extremity of one of the conveying arms and a portion of the lifting mechanism for raising the mantle support off of the carrier. Fig. 21 is a view similar to Fig. 20, showing the lifting device in position to receive the mantle support from the carrying arm. Fig. 21ª is a view similar to Fig. 20, showing the parts in a different position. Fig. 22 is a view taken on line 22—22 of Fig. 20. Fig. 23 is a broken elevation of the operating device or mechanism for moving the conveyer. Fig. 24 is a plan view of Fig. 23. Fig. 24ª is a detail plan view of the operating drum showing the cable fastener. Fig. 25 is a detail view of one of the sprockets and shaft and support therefor. Fig. 26 is a sectional view on line 26—26 of Fig. 25. Fig. 27 is an elevation of the valve operating mechanism for controlling the machine. Fig. 27ª is a detail sectional view of the operating valve. Fig. 28 is an enlarged detail view of a portion of the conveyer chain and the mantle support retaining means. Fig. 29 is a detail view of the swivel nut for closing the tank. Fig. 30 is a detail view of the stop engaged by the swivel nut. Fig. 31 is a detail view of the dog which is locked against movement in one direction for opening the dipping tank. Fig. 32 is a plan view of Fig. 31. Fig. 33 is a detail view of the arm for limiting the movement of the tank cover. Fig. 34 is a detail view of an adjustable nut for varying the movement of the fuel mixing valve. Fig. 35 is a detail view of the mechanism for opening the dipping tank. Fig. 36 is a detail view of the lifting pin for the weighted member. Fig. 37 is a detail of the adjustable stop on the trip for the weighted member. Fig. 38 is a sectional view on line 38—38 of Fig. 11. Fig. 39 is a detail sectional view of the lower track or guide and support for the lower run of the conveyer chain. Fig. 40 is a side elevation of one of the members of the connecting links.

Referring more particularly to the drawings, the same reference numerals designate similar parts throughout the several views.

In this exemplification of the invention the machine comprises front and rear standards 30, 31 suitably spaced from each other, and connected to form a supporting frame by means of cross bars 32, located preferably at the top thereof, and longitudinal bars 33 near the bottom. Between the standards, preferably near the upper ends thereof, are axles 34, suitably journaled or mounted therein. Secured to, or formed on the ends of these axles, preferably adjacent the inner face of each of the standards, is a carrying or lifting reel, designated generally by the numeral 35, which are provided with arms 36, and which are of considerable length, and pivoted to the free end of each arm is a member or hook 37, each of which is provided with a shouldered portion 38 to form a seat, preferably adjacent the free end thereof, and an inclined face or extremity 39, for a purpose to be set forth. A sprocket wheel 40 is secured to the inner face of each of the reels 35, by any suitable fastening means such as screws or bolts 41 passing through slots 42 in the sprocket wheels, and by means of which the sprockets may be rotatively adjusted with relation to the reels 35.

A bar or support 43 extends across the frame work adjacent each pair of standards and is secured by its ends to the standards, as at 44. Each of these bars or supports is parallel with its adjacent axle 34 and is located below said axle. Projecting from said bar or support are suitable arms or brackets 45, which are preferably located within the frame, and journaled in these arms or brackets are axles 46, which are parallel with and located preferably beyond the axles 34. Secured to these axles 46, and adjacent the standards, are sprocket wheels 47, each of which is in direct alinement with the adjacent sprocket 40. Suitable endless sprocket or conveyer chains 48 are arranged to run lengthwise of the frame and pass around the respective sprockets 40, 47, thereby causing the axles 34 and reels 35 to revolve in unison, as will be set forth.

Extending lengthwise of the frame, adjacent to, and adapted to receive and support the upper runs of the chains or conveyers 48 are trough or channel-shaped members 49, (more clearly shown in Fig. 13). These members preferably terminate short of the standards and are supported or secured in position by means of brackets or braces 50, one end of which are secured to the respective standard while the other ends engage and are secured to said members 49 adjacent the extremities thereof. Suitable tracks or supports 51 are also secured lengthwise of the frame adjacent and in close proximity to the lower runs of the conveyers or chains 48 and are preferably L shaped and arranged with the upright portion adjacent the outside of the frame. Secured to these tracks or supports 51 at suitable intervals are arms or brackets 52, which support U-shaped members 53, arranged at suitable intervals and serve to receive the lower runs of the chains or conveyers for supporting and preventing the same from sagging.

Extending above the upper face of the chains or conveyers 48 are projections or pins 54, which serve as holders for the mantle support 55 and which comprise rods or bars provided with spaced circumferential grooves 55$^a$. The mantles are removably secured to and depend from these bars or rods. When these mantle supporting rods or bars 55 are resting upon the upper runs of the chains or conveyers 48, they are prevented from displacement by means of suitable guide boards or shields 56, which are secured to and supported by the trough-shaped members 49, and project slightly above the members; the front ends thereof being bent or deflected as at 57 to permit the entrance of the rods or bars and to serve as a means for positioning the rods on the conveyer.

When the rods are transferred from the upper to the lower runs the rods will rest upon the tracks or supports 51 and will be advanced by means of the projections or pins 54, the upright portions of the tracks or supports serving to prevent the displacement of the rods. The rear extremities of these tracks or supports 51 extend for some distance beyond the sprockets 47 and are bent or deflected upwardly as shown at 58, and secured adjacent the forward extremities thereof in any suitable manner is a member or guide 59, which is also bent or inclined upwardly. If desired, these inclined ends may both be integral with the tracks or supports 51, or separate therefrom.

As the conveyer advances the front reels 35 will rotate so that the pivoted members 37 supported by the arms 36 thereof will be successively brought adjacent one of the mantle supporting rods or bars 55, so that the seats 38 will engage and raise one of the bars from the upper runs of the conveyer chains 48 and eventually place the same upon the lower supports or tracks 51, while the rear carrier or lifting reels will raise the rods or supports 55 from the lower tracks or supports and place the same upon the upper runs, as will be described.

The conveyer is intermittently advanced in any desired manner, but a simple and efficient means for accomplishing this movement comprises a drum 60 rotatably supported by one of the standards 61 constituting a portion of the frame and located preferably intermediate the front and rear standards 30, 31, substantially midway of length of the frame. Projecting from this drum is a yoke 62, to which is pivotally connected one end 63 of a bar or rod 64, the forward or free end of which is preferably beveled or inclined as at 65, and terminates at the extremity in a shoulder 66, which is adapted to engage laterally projecting pins or lugs 67 on the face of one of the sprocket wheels 47 (see Fig. 23). This bar or rod may be made in sections which telescope with each other and held in their adjusted positions by means of a suitable sleeve or collar 68.

As the drum 60 is rotated in a forward direction the shoulder 66 will push upon the engaging pin or lug 67 and rotate the sprocket 47 one step, which will also advance the conveyer 48 one step. In order to prevent the next advancing pin 67 from engaging the rod or bar 64 and disengaging the shoulder 66 from the pin before the drum has completed its forward movement, the end of the rod or bar is provided with a notch or recess 69, into which the advancing pin enters. When the drum is reversed the inclined face 65 will be drawn across the pin which will raise the shouldered extremity sufficient to permit it to drop into operative position with relation to the next pin; the extremity 70 of the rod or bar serving to prevent the end of the rod or bar from dropping out of position.

The drum is preferably provided with two spaced peripheral grooves 71, 72, which communicate with each other by a transverse groove 73. A rope or cable 74 is seated within these grooves and crosses from one groove to the other through the transverse groove 73, and is secured to the drum by means of a clip 75, preferably extending across the transverse groove 73 and removably held in position by suitable screws or bolts 76.

The extremities of the rope or cable are crossed and one is secured to a vertically movable piston 77 adjacent the upper extremity thereof and above the drum, and the other end is adjustably secured to the piston below the drum in any desired manner, such as by a suitable sleeve or collar 78, so that when the piston is raised it will rotate the drum in a forward direction, and when lowered will rotate it in the opposite direction. This rod or piston 77 may be raised and lowered in any suitable manner, but preferably by means of a piston head (not shown) which moves in a cylinder 79 supported by the frame of the machine and which is adapted to receive a suitable fluid, such as air, for moving the piston. Air is supplied to the cylinder from any suitable source of supply through a pipe or tube 80, which communicates with a valve casing 81, and leading from said casing is a pipe 82 which communicates with the top of the cylinder on one side of the piston, and a pipe 83 which communicates with the bottom of the cylinder on the opposite side of the piston. The valve casing is also provided with exhaust ports 84, 85, to which are attached tubular members 86, each of which is preferably provided with an opening or aperture 87 through the side thereof. Seated in these tubular members 86 is a plug or screw 88 having a head 89, by means of which they may be adjusted to regulate the openings 87. A suitable jam nut 90 is also provided on each of the screws or plugs 88, by means of which the latter may be held in their adjusted position. A valve plug 91 is arranged within the casing, and is preferably provided with ports or passages 92, 93, 94. These parts are so arranged that when the plug 91 is in its normal position, as shown in Fig. 27ª, the port 92 will be in communication with the supply pipes 80 and 82, the port 93 will be out of operative position, and the port 94 will be in communication with the pipe 83 and exhaust port 85. Assuming the piston 77 to be in its lowest position as shown in Fig. 6, and the valve is rotated so that the port 92 will form a communicating passage from the pipe 80 to the pipe 83, the air will pass to the bottom of the cylinder and raise the piston. In this position the port 93 will form a communication between the pipe 82 leading from the top of the cylinder and the exhaust port 84, thereby permitting the air above the piston to escape. When the valve is reversed or assumes its normal position to direct the air to the top of the cylinder, the air below the piston will escape through the port or passage 94 and exhaust port 85, thus permitting the piston to ascend. It will be seen that with this construction the rapidity of the movement of the piston may be governed by the size of the exhaust openings 87, which are themselves regulated by the adjustment of the screw or plug 88. If desired, suitable cocks or plugs 95 may be provided in the pipes 82, 83, to permit the escape of any surplus lubricating oil which may have been inserted in the cylinder in any desired manner or forced therein through these plugs or cocks. This valve is preferably operated by means of an operating handle 96 located at the front of the machine, which slides in a suitable guide 97 (see Fig. 27) on one of the front standards 30. The lower end of this handle is connected to one arm of a bell crank or rock lever 98, preferably located adjacent the base of the machine; and extending from the other arm of the lever 98 is a connecting rod or bar 99, which is preferably located beneath and protected by the longitudinal bar 33. The free end of this bar 99 is connected to one arm of a bell crank lever 100, which is pivoted to the inside of the standard or support 61. The other arm 101 thereof is located on the outside of the standard 61, and connected thereto is one end of a vertically sliding bar or rod 102, the upper end of which moves through a suitable guide 103 on the standard 61 and which is located preferably above the valve 81.

Secured to the bar or rod 102 at a suitable point is an arm 104, and a link 105 connects the free end of this arm with the valve plug 91 so that when the bar or rod 102 is moved up and down the link 105 will serve to rotate the plug 91, as will be understood. A spring 106 is secured by one end to the arm 104 and to the standard 61 by its other end and serves to keep the bar or rod 102 raised to hold the valve plug 91 in its normal position as shown in Fig. 27$^a$. A suitable locking means is provided for fastening or holding the bar or rod 102 down against the tension of the spring 106, which comprises a dog or pawl 107 pivotally connected by one end to the guide 103. The free end stands adjacent the upper end of the rod or bar 102, and is provided with a lip or shoulder 108, which normally rests against the face of the rod or bar 102, and is held in position by means of a suitable spring 109. When the extremity of the rod or bar 102 moves below the lip or shoulder 108 on the dog or pawl, the spring 109 will rock the latter on its pivot and cause the lip or shoulder to stand in the path of the upward movement of the end of the arm or bar and thereby lock the same in its lowest position and hold the valve open. The lock thus formed is automatically released by means of an arm or member 110, one end of which is pivotally connected to the standard 61, as at 111, and the free end 112 stands between the rod or bar 102 and the dog or pawl 107 and is normally held down out of engagement with the dog or pawl by means of a spring 113.

A pin or lug 114 projects from the piston rod 77, and when said rod has about reached the limit of its upward movement, this pin or lug will engage the arm or member 110 and raise the free end thereof against the tension of the spring 113. As this member is raised it engages the dog or pawl 107 and rocks the same backward against the tension of the lip or shoulder 108 out of engagement of the end of the rod or bar 102. When thus released the spring 106 will move the rod or bar 102 upward and thereby rotate the valve plug 91 to the position shown in Fig. 27$^a$, which will direct the air into the top of the cylinder and the piston will immediately begin to descend. As the piston rod 77 descends, the springs 113, 109 will return the members 110, 107 to their normal positions. Thus it will be seen that on each forward or upward movement of the piston the conveyer will be advanced one step, and will remain still as the piston is returning. As the conveyer advances the mantle carriers or supports 55 which are placed upon the upper runs of the conveyer chains, adjacent the ends 57 of the guide boards 56, are fed toward the front end of the machine, and as they approach the front end their extremities are engaged by suitable deflectors or positioning members 115 (see Figs. 2 and 3), which properly positions them on the conveyer. The carrier or lifting reels 35 will rotate with each step of advancement of the conveyer so that one of the arms 36 thereof will be in such a position that the pivoted members 37 thereon will cause the seat 38 to engage and raise the foremost one of the mantle supports 55 from the upper run of the belt and carry it forward beyond the front end thereof in a position to be removed from the carrier and placed over the shaping flame, after which it is replaced in a manner to be set forth, and carried into engagement with the guide 59 of the tracks or supports and into engagement with the lower run of the conveyer chains and is intermittently moved along the lower track or support 51 toward the rear of the machine. If for any reason the mantle support should fall from the carrier or be placed improperly upon the guides 59 it will be straightened and moved backward so as to be engaged by the projection 54 on the lower run by means of suitable projecting arms, pins or lugs 116, on the front axle 46 adjacent the sprockets 47 thereon.

The mantles are formed and secured to the supporting rods or bars 55 before being placed upon the conveyer, and before they are finally shaped by a Bunsen flame, as will be described, it is necessary to remove the cotton from the fabric. This is preferably accomplished by burning the same with a strong flame which necessitates removing the support and mantles from the conveyer and replacing them upon the conveyer after having been burned. A simple and efficient means for automatically accomplishing this end will now be described.

Secured to the standards 30 above the upper runs of the conveyer and projecting toward the rear of the frame are arms or projections 117, which may also be supported by members 118 extending from the braces or brackets 50. Extending above the arms or projections 117 preferably adjacent the standards, are ears 119, and extending across the framework and journaled in these ears is a rock shaft 120, which may be prevented from displacement in any suitable manner. The end of this shaft on the side of the frame adjacent the drum 60 is preferably bent downward to form an arm 121. A pair of arms 122 are secured by one end to the shaft 120 within the frame and are held in any desired position by a suitable screw or bolt 123. These arms may be made in sections if desired and are of a length to project forward for some distance above and adjacent the upper runs of the conveyer chains, and pivotally connected to the forward end of each arm is a depending link 124. The body of the link is preferably offset as at 125, with the end bent inward as at 126, the extremity of which is bent upward as at 127, preferably parallel with the offset portion 125. This extremity 127 is notched or bifurcated as at 128, and is adapted to receive and hold one of the mantle supporting rods 55. Secured to the arms or projections 117, adjacent the links 124, are brackets 129, to which are secured spaced guides 130, and these guides are so located that the offset portions 125 of the links 124 will engage and move against said guides, and the links are prevented from displacement by means of a lateral projecting pin or lug 131 moving between the guides 130. The links 124 and the inwardly bent portions 126 are of such a length that when in a normal position the portion 127 will stand adjacent the outside of and project slightly above the channel or trough-shaped chain guide 49.

Projecting rearwardly from the shaft 120 is an arm 132, and adjustably secured thereto is a counterbalancing weight 133 for the arms 122 and links 124. These brackets 129 preferably project for some distance above the arms or projections 117 to prevent lateral displacement of the links 124 and also to allow the mantle supporting rod 55 resting in the notch 128 to be raised high enough so that the entire area of the mantles supported thereby may be brought between and exposed to the flame from a series of oppositely disposed jets or burners 134 projecting from the spaced parallel supply pipes 135. These pipes are arranged between and supported by the arms or projections 117 preferably adjacent the free ends thereof; the tips or burners 134 being preferably inclined or deflected downward and toward each other. These pipes 135 are connected to a mixing valve, designated generally by the numeral 136, the construction of which will form the subject-matter of a separate application. This valve receives an air supply through a branch pipe 137, leading preferably from the air pipe 80 which supplies the cylinder 79, and a gas supply from any suitable source, through the pipe 138, and each of these supply pipes may be provided with regulating valves 139, located preferably adjacent the mixing valve 136. This mixing valve is provided with a plug, to which is secured in any desired manner an operating handle or lever 140, provided with apertures 141 adjacent its free end. A link 142 is connected by one end to the end of the arm 121, and said link is provided with a slot 143 adjacent its free end, and is loosely connected to the operating handle or lever 140 by means of a screw or bolt 144 passing through the slot 143 into one of the apertures 141. Passing through the slot 143 is a bolt or member 145, which is adjustable in said slot and is held in position by means of a nut 146, and may be adjusted toward or away from the screw or bolt 144 so that the link 142 may have an independent movement with relation to the operating lever or handle 140, the end of the slot 143 and the bolt or member 145 forming tappets adapted to engage the bolt or screw 144, thereby rendering it possible to regulate the operation of the mixing valve. Thus when the arm 121 is moved to operate the arms 122 to raise the mantle support 55 between the burners 134, the member 145 will engage the screw or bolt 144 to move the handle or lever 140 to raise the flame of the burners, and when the arm 121 is moved in the opposite direction to lower the mantles, the end of the slot will engage the screw or bolt 144 and move the lever or handle in the opposite direction to lower the flame. This arm 121 is preferably moved by the drum 60, to the shaft of which is loosely pivoted a bell-crank lever, having depending arms 147, 148. The arm 148 may be made in sections and adjustable if desired, while the arm 147 is preferably longer, and is provided with a plurality of apertures in its free end. A connecting bar or link 149 is also provided with a plurality of apertures in one end, any one of which is adapted to register with any of the apertures in the arm 140, by means of which it is adjustably secured to said arm, the other end being pivotally connected to the arm 121 of the shaft 120.

Secured to the face of the drum 60 is a stationary pin or lug 150 and an adjustable lug 151. These lugs are so arranged that as the drum 60 is about to complete its forward movement the lug 151 will engage and move the arm 147, thereby drawing on the connecting rod or link 149 to rock the shaft 120 for raising the mantle support which rests in the links 124. The parts will be retained in this position by the weight 133 until the drum 60 is about to complete its rearward movement, when the pin or lug 150 will engage the other arm 148 for rocking the shaft in the opposite direction. By adjusting the lug or stop 151 the length of movement of the arm 147, and the height to which the mantle support is raised, may be regulated. After the mantles have been thus subjected to the flame, the cotton will be burned out of the mantles and the support will then be deposited upon the upper runs of the conveyer chains by means of the notched ends of the links passing far enough below the chain guide or support 49 to disengage the ends of the bars or supports 55. The conveyer will then be intermittently advanced and the support with the prepared mantle will be raised by the pivoted members 37 on one of the arms 36 of each of the carrying reels 35 until it has reached the extreme forward position as shown in Figs. 1 and 2. In this position it is ready to be lifted from the carrying reel and placed over the shaping flame in any desired manner. A simple and effective mechanism for this purpose comprises a pair of parallel vertically movable bars 152, which move in guides 153 suitably located on the frame. Journaled across the base of the frame adjacent the bars 152 is an axle 154, projecting from each end of which is a forwardly extending arm 155. Disposed between the lower end of each of the bars 152 and its respective arm 155 is a link connection, comprising members 156 and 157, which are spaced from each other by means of the bolts or rivets 158. The end of the rod 152 is secured between the ends of the members by means of a transverse pin or bolt 159, and the arm 155 is secured between the lower extremities by means of a similar pin 160. The members 156 are provided with slots 161 for the reception of the end of the pins 159, 160 so as to permit the ends of the rods 152 or the arms 155 to move independently to accommodate any uneven or rocking movement to prevent injury to the bars 152. This lifting mechanism is counterbalanced by means of an adjustable spring 162 surrounding one end of the shaft 154, one end of which 162$^a$ engages the frame and the other a collar 162$^b$ on the shaft. An operating handle 163 sliding in suitable guides 164 is connected to one of the bars 152 as at 165$^a$, and by moving this handle up and down the bars 152 will be simultaneously raised or lowered.

Adjustably secured to each of the rods 152 is a collar 165, which is preferably provided with a flat face 166, and a bracket 167 is adjustably secured by one end to said face by means of suitable screws or bolts 168 passing through slots 169 and into the collar 165. The forward ends of these brackets are notched to form seats 170 for the mantle support 55.

Pivoted to the face of the bracket 167, preferably adjacent its forward end and in proximity to the seat 170, is a weighted latch 171, which is adapted to engage a lateral projection or stop 172; and projecting from the latch at a point adjacent the free extremity of the bracket and beyond the seat 170, is a laterally extending pin or lug 173. These brackets are arranged in alinement with each other, and are adapted to be simultaneously raised so that the pin or projection 173 will engage the inclined face 39 of the pivoted members 37, which stand within the path of their upward movement. The brackets being so located as to pass on the inside of the members 37. These members 37, together with the mantle support 55, being heavier than the latches 171, will cause the latter to be moved about their pivots as the pin or projection 173 moves along the inclined face 39. This movement will continue until the brackets have been raised high enough so that the seats 170 will engage the mantle support held in the seats on the members 37, (as shown in Fig. 21). A slightly further upward movement will raise the mantle support 55 off of the seats 38. The latches 171 being then heavier than the members 37, will move about their pivots and throw the members 37 backward, which will permit the brackets to be lowered with the mantle support 55 and the mantles thereon. Arranged within the path of the downward movement of the mantles are a series of shaping burners 174, which pass inside of the mantles, to fill the mantles out and shape them by means of a strong Bunsen flame. The members 37 being relieved of the weight of the support 55 and the mantles thereon, will swing slightly forward by gravity, so that the inclined faces 39 thereon will move out of the path of the upward movement of the pin or projection 173, so that when the brackets are raised after the mantles have been shaped, the extremities of the members 37 will pass in front of the pin or projection and the inclined face 39 will engage the mantle support 55, which will move it back far enough to cause the seat 38 to engage the support, the pin or projection 173 in this instance serving to prevent the members 37 from swinging too far outward. After the mantle support has been replaced upon the carrier reel the conveyer may be advanced another step. This operation is employed when depending mantles are to be shaped, but if the mantles were inverted the same operation would be employed, except the brackets would be raised toward a series of depending burners 175 located at the top of the machine, and in replacing the support on the carrier or lifting reels the bracket would have to be lowered below the members 37 and then raised, as will be understood, suitable stops 152$^a$ being provided on the rods 152 for limiting its movement. The members 37 will pass slightly below the lower track or guide 51, so that the ends of the supports 55 will engage and rest thereon, and also be disengaged from the seats 38 and moved forward by the lower run of the carrier away from the members 37 to permit the latter to move upward.

The shaping burners 174 comprise a series of burners communicating with a chamber 176, which is supplied with gas through the pipe 138, which also supplies the burners 134, and a regulating valve 177 may be provided in the pipe adjacent the burners 174. Extending from the gas pipe is a tube 178, provided with a burner 179 for a pilot light by means of which the burners 174 and 175 may be lighted when needed. A branch pipe 180 also leads from the pipe 138 to the chamber 181 for supplying the burners 175, and a valve 182 may be provided for cutting off the supply to the chamber 181 when not needed; and a suitable valve 183 may also be provided for cutting off the supply to the chamber 176 when the burners 174 are not to be used. The chamber 176 is also supplied with air from the pipe 80, which is provided with a suitable regulating valve 184. A branch pipe 185 leads from the pipe 80, and also communicates with the chamber 181 for supplying air thereto, and said supply may be cut off from the chamber by means of a suitable valve 186 in the branch 185. A similar valve 187 may also be provided in the pipe 80 adjacent the chamber 176 to cut off the supply of air thereto when the burners 174 are not to be used. When the mantles are lowered onto the burners 174 the gas and air are turned on and regulated by the valves 177, 184, and the burners lighted by the pilot light 179. During the process of shaping the mantles may be raised and lowered by operating the handle 163 of the lifting mechanism. After the mantles have been thus shaped and the support 55 placed upon the track 51, they will be intermittently moved toward the rear of the machine until they reach the dipping tank 188, which is preferably removably supported upon tracks or guides 189 secured to the standards 61 and in such a position that the tank will be located below the lower run of the conveyer chain 48 and extend across the frame. When in this position the support 55 will be lowered so as to dip the mantles in a suitable preserving solution in the tank, after which it is returned to the conveyer and advanced to bring the next support into position for a similar operation. A simple and efficient means for accomplishing this end will now be described.

Slidably mounted in suitable guides on each of the standards 61 is a vertical rod or bar 190, to the upper end of which is adjustably secured a sleeve or collar 191, and projecting from this collar is an arm or bar 192, which is located beneath and parallel with the lower run of the chain 48. A sleeve or collar 193 is secured to the arm or bar 192 for longitudinal adjustment thereon, and a bracket 194 is secured to and vertically adjustable with relation to the sleeve or collar 193, by means of suitable screws or bolts 195 passing through slots 196 in the bracket and into the sleeve or collar 193. The upper edge of each of these brackets is corrugated or provided with depressions 197, adapted to receive and hold the supports 55 for dipping the mantles. These brackets normally stand in close proximity to the lower runs of the conveyers and the tracks 51, and as the supports are advanced along the tracks 51 they will drop through an opening 198 (see Fig. 14) in the tracks and fall into one of the seats or depressions 197 in the brackets 194, as shown in Figs. 2, 14, 15 and 17. These rods 190 are connected for simultaneous movement preferably by means of spaced members 199, forming links similar to the members 156, 157, which are secured by one end to the lower ends of the rods 190 and by their other ends to one end of arms 200, which are adjustably secured to an axle 201 adjacent the standards 61. This axle is supported by suitable journals 202, and is provided with a weight 203, which is heavy enough to normally raise the bars 190 to hold the brackets 194 in close proximity to the conveyer chains 48. Thus it will be seen that when the rods 190 are depressed the weight 203 will be raised, and when the rods are released the weight will return them to their normal position. In order to permit a steady and uniform movement to the rods or bars 190 and prevent the supports 55 from being jarred off of the brackets 194, a suitable dash-pot 204 may be provided, the piston 205 of which is connected to one of the rods or bars 190 by passing through a bracket 206 thereon and held from displacement by nuts 207 on each side of the bracket. If desired, a suitable adjustable stop 208 may be provided on the rod 190 to limit its downward movement, and an adjustable stop 209 may be secured to the collar 191, and is arranged to engage the lower face of the tracks or supports 51 to limit the upward movement.

One of the arms 200 is provided with a slotted guide 210, preferably in the form of a bracket secured thereto, and passing through and extending below this guide is one end of a sliding bar or member 211, the upper end of which is provided with a slot 212. This bar or member may be supported in any desired manner, preferably by means of a bar or rod 213 secured thereto by one end preferably midway of the ends of the member, the other end passes loosely through a suitable bracket 214 secured to the standard 61, and said rod is prevented from disengagement from the bracket by means of a suitable head or nut 215.

The lower extremity of the bar or member 211 is provided with a shoulder 216, adapted to engage one edge of the slotted guide 210, when raised into proximity thereto, and said shoulder is forced and held in engagement therewith by means of a spring 217 arranged on the opposite side of the slotted guide. The laterally projecting pin or lug 114 on the piston rod 77, projects through suitable guides 218 secured to the standard 61, and projects beyond said guides and into the slot 212 of the bar or member 211. The extremity of this lug or pin 114 is provided with a circumferential groove or depression 219, which is adapted to receive and form guides or ways for the sides of the slot 212 of the members 211, and to prevent disengagement of the pin and bar or member. The extremity of this pin 114 is placed in the slot 212 by removing the member 220, which forms a closure for the top thereof. A weight 221 is secured to this bar or member 211, preferably above the slotted guide 210 on the arm 200, and serves to hold said bar or member 210 in its lowest position. Secured also to the arm 200 adjacent the slotted guide 210 is a bracket 222, and adjustably secured to the bracket is a laterally projecting lug or member 223, which is normally spaced from the bar or member 211.

As the piston-rod 77 rises the pin 114 will move in the slot 212 of the bar or member 211, until it strikes the top 220 thereof, which it will do as it is just about to reach the limit of its upward movement to move through the slotted guide 210 until the spring 217 engages the edge of the slot, which will force the shoulder 216 over the opposite edge of the slot. When the piston-rod descends the weight of the bar or member 211 will be transferred to the arm 200, owing to the fact that these two members will be locked together, and as the dash-pot 204 will retard their descent, the piston will return more rapidly than these members. The extra weight being thus placed upon the arm 200 will overcome the weight 203 and cause the bars or rods 190 to descend. This movement will continue until the mantles held by the descending support 55 enter the dipping tank 188, at which time the projection 223 on the bracket 222 will engage the bar or member 211, and move its extremity against the tension of the spring 217 to disengage the shoulder 216. Thus disengaged the bar or member 211 will remain stationary, and as the extra weight has been removed from the arm 200, the weight 203 will be sufficient to again raise the bars 190 and carry the mantle support back and through the opening 198 in the track 51 and into position to be advanced by the carrier. All rotary movement of the bars 190 is prevented by the link connecting members 199, and at the same time the slots in one of said members will permit the parts to move slightly independently of each other to prevent straining of the parts if the necessity should so require.

The dipping tank 188 may be provided with a cover 224, which is adapted to be automatically removed and replaced in any suitable manner, but a simple and efficient means for accomplishing this end comprises a rod or bar 225 journaled in suitable supports and extending across the frame adjacent the tank, and secured to which are arms 226, which are suitably connected to the cover 224, so that when the rod or bar 225 is rocked backward or forward the arms 226 will withdraw or replace the cover.

Pivoted to the standard 61 adjacent one of the arms 226 is a bell crank lever 227, one arm of which is preferably deflected so as to stand adjacent to one of the arms 226 and is pivotally connected thereto by means of an arm or extension 228. Pivotally connected to the other arm of the lever 227 is a dog or latch 229, the pivot point of which is preferably located remote from the end of the arm, and adjacent said end is a laterally projecting pin or lug 230, which is adapted to be engaged by and support the free end of the latch or dog. This latch or dog is located in close proximity to the standard 61 and within the path of the upward movement of the lug or pin 114 on the piston 77, so that when the piston moves upward the latch or dog will be engaged and moved about its pivot by the pin or lug 114, thus permitting the latter to pass, after which the latch or dog will fall into engagement with the projection 230 and in the path of the return movement of the pin 114. As the piston descends the pin or lug 114 will engage the thus locked latch or dog 229 and rock the bell crank 227, which in turn will rock the bar or rod 225 and arms 226 and withdraw the cover. A suitable weight 231 is arranged preferably on the rod or bar 225 and so located as to continue the movement of the rod or bar 225 after it has been moved over the center. An adjustable arm 232 may be secured to the rod or bar 225 adjacent the opposite standard 61, which moves between two lugs or stops 233 on said standard to limit the movement of the arms 226 and the cover 224. In order to return the cover or close the tank there is provided an arm 234 which projects from the rod or bar 225, and pivotally connected to this arm is one end of a rod or bar 235, the other end of which passes loosely through a swiveled nut or bearing 236, supported by one of the arms 200, preferably adjacent the opposite side of the machine, and secured to the rod 235 is an adjustable sleeve or collar 237.

When the arms 200 are moved downward during the opening of the tank, the bar or rod 235 will move through the nut or member 236, which latter turns about its pivot to permit such movement, but when the arms are released so that the weight 203 will return them to their normal position, the swiveled nut or member 236 will move into engagement with the sleeve or collar 237 on the rod and raise the same, thereby rocking the rod or bar 225, and will continue to move said bar 225 until the weight 231 thereon passes over the center, which latter will continue the movement of the bar 225 until the arm 232 engages its respective stop 233, at which time the cover 224 will be closed.

In order to prevent sparks from the burners from dropping into the dipping tank when the latter is open a shield 238 may be provided, which is supported preferably above the lower runs of the conveyer chain 48 by means of brackets or supports 239 on the tracks or supports 51.

From the above description it is thought that the operation will be fully understood, but briefly stated it is as follows: The mantles are first formed and secured to the supports 55 in any desired manner, preferably removably, after which the supports are placed upon the upper runs of the conveyer chains 48 between the projections 54, and preferably at the ends 57 of the guide boards 56, which latter serve as a means for assisting in properly placing the supports. The various regulating valves having previously been properly adjusted, the operating handle 96 is manipulated to operate the valve plug 91 to direct the air beneath the piston head in the cylinder 79, to raise the same, the normal position of the piston head and rod being down. As the piston rises the rope or cable 74 will rotate the drum 60 to move the rod or bar 64 forward, the forward extremity of which will press against one of the pins or projections 67 on the sprocket wheel 47, which will move the conveyer chains one step forward and thus intermittently advance the mantle supports 55. The carrying or lifting reels rotate simultaneously with the conveyers, and as the supports reach the forward end of the conveyers one of the pivoted members 37 on one pair of the arms 36 of the reels 35 will engage and cause the support to rest upon the seats 38 therein and carry the support to the extreme forward position and within the path of the upward movement of the brackets 167. This support will remain in this position during the reverse movement of the piston rod 77 and the rod or bar 64, and until the valve plug 91 is again operated to advance the conveyer. The operator then raises the handle 163 to cause the brackets 167 to raise the support from the members 37 of the carrying or lifting reel 35. After disengaging the same the handle 163 may be lowered (or raised if the mantles are inverted), causing each of the mantles to pass over one of the burners 174, in which position they are retained by means of the counterbalancing spring 162. The valves 177, 184 may then be opened to supply fuel to the burners 174, which latter are lighted by means of the pilot burner 179. The mantles may be moved slowly up and down by means of the handle 163, and the action of the strong flame will fill out and shape the mantles, after which the brackets 167 are raised and the support and the shaped mantles are replaced upon the carrying or lifting reels 35, in the manner already set forth.

Before the mantles reach the carrying or lifting reels 35, the supports 55 are engaged by means of the links 124, which are raised from the upper runs of the conveyer chains by means of the lug 151 on the drum 60 engaging the arm 147 and moving the same about its pivotal support as the drum rotates forwardly to draw upon the rod or bar 149 and rock the shaft 122. This operation will raise the mantles upon the support so that they will stand between the two rows of burners 134. Simultaneously with the raising of the mantles between the burners, the bar or rod 142 will operate the mixing valve 136 to furnish fuel to the burners 134. The mantles will remain between these burners until all of the cotton in the material has been thoroughly burned out and until the piston 77 descends to rotate the drum in the opposite direction, which will cause the screw or projection 150 to engage the arm 148 to move the bar 149 to rock the shaft 120 in the opposite direction, which will lower the links 124 to replace the support upon the upper runs of the conveyer chains, and also to lower the flame from the burners 134 in the manner already set forth. From this point the mantles are advanced to the shaping burners. After the mantles have been shaped the support is placed upon the tracks or guides 51 by means of the arms 36 of the lifting or carrying reels 35, and are advanced toward the rear of the machine and the dipping tank by means of the projections 54 on the lower runs of the conveyer chains. The supports will then be intermittently advanced along this track or guide 51 until they reach the openings 198 therein, at which point the ends thereof will drop through the openings and upon the brackets 194, which are normally in close proximity to the openings. As the piston rises to rotate the drum 60 in a forward direction the pin or projection 114 thereon will move upwardly in the slot 212 and engage the top 220 thereof to raise the member or bar 211, causing the same to slide through the guide slot 210 on one of the arms 200 until the shoulder 216 thereon is forced by the spring 217 into engagement with one side of the arms 200. The piston then immediately descends, thus placing the weight of the bar or member 211 upon the arm 200 to overcome the weight 203. This will depress the forward end of the arms 203, and draw the rods or bars 190 with the brackets 194 and the support resting thereon downward, until the mantles enter the dipping tank. As the pin 114 travels upward with the piston 77 it will engage and pass the latch or dog 229, which latter will fall into the path of the return movement of the pin after the pin has passed.

The downward movement of the piston will cause the pin 114 to engage the locked dog 229 and move the lever 227 about its pivot to rock the bar or rod 225 to throw the weight 231 over the center and draw upon the arms 226 to remove the cover of the tank. As the forward ends of the arms 200 move downward the projection 223 on the arms will engage the bar or member and shove the extremity against the tension of the spring 217 to disengage the shoulder 216. Thus released the weight 203 will raise the rods 190, brackets 194 and the support 55 thereon, so that the ends of the latter will pass through the openings 198 in the tracks or guides 51 and into position to be engaged by the projections 54 on the conveyer chains and advance toward the rear of the machine. Upon the upward movement of the arms 200, the swiveled nut 236 thereon will engage the collar 237 on the bar or rod 235 to rock the bar or rod 235 to move the weight 231 to the other side of the center to close the tank. After being replaced, the supports are advanced toward the rear of the machine, where they are preferably lifted from the lower to the upper runs of the conveyer chains by lifting reels similar to those at the front of the machine, and advanced to a point preferably in proximity to the point at which they were originally placed upon the conveyer chains, at which point they are removed. The conveyer chains project for some distance beyond the dipping tank, in order that the mantles will have sufficient time in which to become thoroughly dry, before being removed from the machine. Thus it will be seen that with this improved machine the cotton is first burned out of the mantles, the mantles then shaped, after which they are dipped in a preserving solution, and finally allowed to dry before being removed from the machine. Furthermore, with this arrangement the valve 81 may be so regulated that the piston in the cylinder will move slowly at first and gradually increase in speed, which prevents the mantles from swinging upon or being thrown off of their supports, which would be the result if the piston and machine were started suddenly.

It is to be understood that the bar or rod 64 is of sufficient length to move the sprocket wheel 47 and advance the conveyer chains the full limit of movement before the stop or lug 151 engages the arm 147 to operate the rock shaft 120.

In order that the invention might be fully understood, the details of an embodiment thereof have been thus specifically described, but

What I claim is:—

1. In a machine for the purpose described, the combination of a mantle support, a conveyer for advancing the support, and means for removing the support from the conveyer and for replacing the same in a position to be further advanced by the conveyer.

2. In a machine of the class described, the combination of a mantle support, an endless conveyer for the support comprising an upper and a lower run, means for lifting the support from the upper run and for placing the same adjacent the lower run at one end of the conveyer, and means adjacent the other end of the conveyer for lifting the support from the lower run and replacing the same upon the upper run.

3. In a machine of the class described, the combination of a mantle support, an endless conveyer for advancing the support comprising an upper and a lower run, means for lifting the support from one of the runs and for placing the same adjacent the other run to be further advanced by the conveyer, and means for intermittently moving the conveyer.

4. In a machine of the class described, the combination of a mantle support, an endless conveyer for advancing the support comprising an upper and a lower run, means for lifting the support from one of the runs and for placing the same adjacent the other run to be further advanced by the conveyer, and means for intermittently operating said lifting means.

5. In a machine of the class described, the combination of a mantle support, an endless conveyer for the support, comprising an upper and a lower run, means for lifting the support from one of the runs and for placing it adjacent the other run to be further advanced thereby, and a single means for simultaneously moving the conveyer and operating the lifting means.

6. In a machine of the class described, the combination of a mantle support, an endless conveyer for the support, comprising an upper and a lower run, means for lifting the support from one of the runs and for placing it adjacent the other run to be further advanced thereby, and a single means for simultaneously and intermittently moving the conveyer and operating the lifting means.

7. In a machine of the class described, the combination of a mantle support, an endless conveyer for the support, comprising an upper and a lower run, means for lifting the support from one of the runs and carrying the same beyond the end of the conveyer, and means for holding the support in its projected position, said lifting means being adapted to place the support adjacent the other run of the conveyer to be further advanced.

8. In a machine for the purpose described, the combination of a mantle support, an endless conveyer for the support comprising two runs, means for lifting the support from one of the runs and for carrying the same away from the conveyer, and means for intermittently operating said lifting means, whereby the support will be held at an interval of rest beyond the conveyer, said lifting means being adapted to replace the support adjacent the other run of the conveyer to be further advanced thereby.

9. In a machine for the purpose described, the combination of a plurality of mantle supports, an endless conveyer for the supports, means for operating the conveyer, a lifting reel operatively related to the conveyer and comprising spaced arms, and means operatively related to the arms adapted to successively engage the supports and raise them from one of the runs of the conveyer, said reel being also adapted to place the supports adjacent the other run of the conveyer for further advancing the supports.

10. In a machine for the purpose set forth, the combination of a plurality of mantle supports, an endless conveyer for the supports, a lifting reel operatively related to the conveyer and comprising spaced arms, means operatively related to the arms for successively engaging and lifting the supports from one of the runs and carrying the same beyond the conveyer, and means for intermittently operating the conveyer and the reel whereby the supports will be held at an interval of rest out of engagement with the conveyer, said reel being adapted to place the supports adjacent the other run of the conveyer to be further advanced thereby.

11. In a machine for the purpose described, the combination of a rotatably supported lifting reel, a sprocket supported by said reel and axially adjustable with relation thereto, a mantle support, an endless conveyer for the support, said conveyer engaging the sprocket and comprising spaced runs, means for moving the conveyer and rotating the reel, and means operatively related to the reel for engaging and lifting the support from one of the runs of the conveyer to the other run.

12. In a machine for the purpose described, the combination of an endless conveyer comprising spaced runs, mantle support holders thereon, mantle supports, means for operating the conveyer, deflectors adjacent the conveyer adapted to engage the supports for positioning the same on the conveyer, and means for lifting the supports from one of the runs and for placing the same adjacent the other run to be further advanced by the conveyer.

13. In a machine for the purpose described, the combination of an endless conveyer comprising an upper and a lower run, a support for the upper run, a guide adjacent the lower run, means for operating the conveyer, mantle supports adapted to be advanced by the upper run of the conveyer, means for lifting the supports from the upper runs and for placing them upon the guide adjacent the lower run, and means operatively related to the conveyer for moving the supports along the guide.

14. In a machine for the purpose described, the combination of an endless conveyer comprising an upper and a lower run, a support for one of said runs, mantle supports engaging said run, a guide adjacent the other run, means for lifting the supports from said run and for placing the same upon the guide adjacent the other run, means operatively related to the conveyer and adapted to engage the supports to move the same along the guide, and means for intermittently moving the conveyer and operating the lifting means.

15. In a machine for the purpose described, the combination of an endless conveyer comprising an upper and a lower run, a support for one of said runs, mantle supports engaging said run, a guide adjacent the other run, means for lifting the supports from said run and for placing the same upon the guide adjacent the other run, means for directing the mantle supports to the guide, means operatively related to the conveyer and adapted to engage the supports to move the same along the guide, and means for intermittently moving the conveyer and operating the lifting means.

16. In a machine for the purpose described, the combination of an endless conveyer comprising an upper and a lower run, a support for one of said runs, mantle supports engaging said runs, a guide adjacent the other run, means for lifting the supports from said run and for placing the same upon the guide adjacent the other run, means for directing the mantle supports to the guide, means operatively related to the conveyer and adapted to engage the supports to move the same along the guide, means for moving the mantle supports into engagement with the last said means, and means for intermittently moving the conveyer and operating the lifting means.

17. In a machine for the purpose described, the combination of an endless conveyer comprising an upper and a lower run, mantle supports engaging one of the runs, a lifting reel comprising spaced arms, gravity members carried by the arms and adapted to engage and lift the supports from one of the runs and for placing the same into position to be advanced by the other run, and means for intermittently moving the conveyer and for operating the lifting reel.

18. In a machine for the purpose described, the combination of an endless conveyer comprising an upper and a lower run, mantle supports engaging one of the runs, a lifting reel comprising spaced arms, gravity members carried by the arms and adapted to engage and lift the supports from one of the runs for placing the same into position to be advanced by the other run, means for disengaging the gravity members from the mantle supports, and means for intermittently moving the conveyer and for operating the lifting reel.

19. In a machine for the purpose described, the combination of an endless conveyer comprising upper and lower runs, mantle supports engaging one of the runs, a lifting reel comprising spaced arms, pivoted members supported by the arms, said members being provided with a seat for the mantle supports, means for intermittently advancing the conveyer and rotating the reel to cause the seats on the pivoted members to successively engage the mantle supports and raise them from the conveyer, said reel being adapted to place the supports adjacent the other run of the conveyer to be further advanced thereby, and means for removing the mantle supports from the seats in the pivoted members.

20. In a machine for the purpose described, the combination of a mantle support, a conveyer for said support comprising spaced runs, a reel adapted to remove the support from one of the runs and place it adjacent the other run, means for moving the reel, means for interrupting the movement of the reel while the mantle support is held thereby, and means for removing the mantle support from the reel during the interrupted movement of the reel.

21. In a machine for the purpose described, the combination of a mantle support, a conveyer for the support comprising spaced runs, a reel adapted to remove the support from one of the runs and place it adjacent the other run, means for intermittently operating the reel whereby the mantle support will be held out of engagement with the conveyer, and means for removing the support from the reel during its interval of rest, the last said means being adapted to replace the support upon the reel.

22. In a machine for the purpose described, the combination of a mantle support, a conveyer for the support comprising spaced runs, a reel adapted to remove the support from one of the runs and place it adjacent the other run, means for intermittently operating the reel whereby the mantle support will be held out of engagement with the conveyer, and manually operated means for removing the support from the reel during its interval of rest, the last said means being adapted to replace the support upon the reel.

23. In a machine for the purpose described, the combination of a mantle support, a conveyer for the support comprising spaced runs, a reel adapted to remove the support from one of the runs and place it adjacent the other run, means for intermittently operating the reel whereby the mantle support will be held out of engagement with the conveyer, and counterbalanced means for removing the support from the reel during its interval of rest, the last said means being adapted to replace the support upon the reel.

24. In a machine for the purpose described, the combination of a mantle support, a conveyer for the support comprising spaced runs, a reel adapted to remove the support from one of the runs and place it adjacent the other run, means for intermittently operating the reel whereby the mantle support will be held out of engagement with the conveyer, and means for automatically releasing and removing the support from the reel during its interval of rest, the last said means being adapted to replace the support upon the reel.

25. In a machine for the purpose described, the combination of a mantle support, a conveyer for the support comprising spaced runs, a reel adapted to remove the support from one of the runs and place it adjacent the other run, means for intermittently operating the reel whereby the mantle support will be held out of engagement with the conveyer, and means for automatically releasing and removing the support from the reel during its interval of rest, said automatic releasing means being also adapted to cause the reel to engage the support for replacing the latter on the reel.

26. In a machine for the purpose set forth, the combination of a mantle support, a conveyer for the support comprising spaced runs, a reel, pivoted members supported by the reel and adapted to remove the support from one of the runs and place it adjacent the other run, means for intermittently operating the reel whereby the mantle support will be held out of engagement with the conveyer, means for receiving the support from the reel, and a pivoted member operatively related to the last said means and adapted to release the support from the reel, the last said pivoted member being also adapted to engage the pivoted member on the reel for replacing the support upon the reel.

27. In a machine for the purpose set forth, the combination of a mantle support, a conveyer for the support, a reel, pivoted members on the reel adapted to remove the support from the conveyer, means for receiving the support from the reel, and a gravity member operatively related to the last said means and adapted to engage the pivoted member for releasing the support.

28. In a machine for the purpose set forth, the combination of a mantle support, a lifting reel, pivoted members on the reel adapted to engage and lift the mantles, brackets, means for moving the brackets into engagement with the support for raising the same out of engagement with the pivoted members, and means on the brackets adapted to engage the pivoted members for moving said members out of the path of movement of the support when the latter are resting upon the brackets.

29. In a machine for the purpose set forth, the combination of a mantle support, a lifting reel, pivoted members on the reel, provided with seats adapted to receive the support, said members being also provided with an inclined portion adjacent the seats, a bracket for receiving the support from the reel, a gravity member on the bracket, said bracket being adapted to be moved into engagement with the support for raising the same from the seat, and said gravity member being adapted to engage the inclined face to move the seat out of the path of the movement of the support when the latter is lowered by the bracket.

30. In a machine for the purpose set forth, the combination of a mantle support, a lifting reel, pivoted members on the reel, provided with seats adapted to receive the support, said members being also provided with an inclined portion, a bracket for receiving the support from the reel, a pivoted gravity member on the bracket, said bracket being adapted to be moved into engagement with the support for raising the same from the seat, said inclined portion being adapted to engage and move the gravity member about its pivot as the bracket is raised, and said gravity member being adapted to assume its normal position with relation to the bracket to move the seat out of the path of movement of the support when the latter is lowered by the bracket.

31. In a machine for the purpose set forth, the combination of a mantle support, a lifting reel, pivoted members on the reel, provided with seats adapted to receive the support, said members being also provided with an inclined portion, a bracket for receiving the support from the reel, a pivoted gravity member on the bracket, a lateral projection on said member, said bracket being adapted to be moved into engagement with the support for raising the same from the seat, said inclined portion being adapted to engage the projection to move the gravity member on the bracket about its pivot as the bracket is raised, said gravity member being adapted to assume its normal position with relation to the bracket to move the first said members about their pivots and the seats thereon out of the path of the movement of the support when the latter is lowered by the bracket, and means whereby the first said members will assume a position to cause the projection on the gravity member on the bracket to pass behind the said first members to cause the seats to engage the support when the bracket is again raised.

32. In a machine for the purpose set forth, the combination of a mantle support, a lifting reel, pivoted members on said reel, said members being provided with an inclined portion and a seat for the support, a bracket for receiving the support from the seat, a pivoted gravity member on the bracket, a projection on the gravity member, the weight of the support upon the first said members being adapted to cause the inclined portion to stand within the path of the upward movement of the projection of the gravity member on the bracket, said bracket being adapted to be moved into engagement with the support to raise the same from the seat of the first said members, said projection being adapted to engage the inclined portion whereby the gravity member will be moved about its pivot while the support is resting upon the first said members, and said gravity member being adapted to assume its normal position when the support is released from the first said members to move the seats of the latter out of the path of the downward movement of the support, said first members being adapted to assume their normal position when the support is removed therefrom so that the projection on the gravity member will pass behind the said first member when the bracket is again raised to hold the seats in position to receive the support.

33. In a machine for the purpose set forth, the combination of a mantle support, a conveyer for the support, means for removing the support from the conveyer and for replacing the same thereon, means for lifting the support from the first said means and for replacing the same, and means for shaping the mantle when supported by the last said means.

34. In a machine for the purpose set forth, the combination of a mantle support, a conveyer for the support, means for removing the support from the conveyer and for replacing the same thereon, counterbalanced means for lifting the support from the first said means and for replacing the same, and means for shaping the mantle when supported by the last said means.

35. In a machine for the purpose set forth, the combination of a mantle support, a conveyer for the support, means for removing the support from the conveyer and for replacing the same thereon, manually operated means for lifting the support from the first said means and for replacing the same, and means for shaping the mantle when supported by the last said means.

36. In a machine for the purpose set forth, the combination of a mantle support, a conveyer for the support, means for removing the support from the conveyer and for replacing it thereon, a shaping burner, and means for lifting the support from the first said means and placing the mantle supported thereby over the burner and for replacing the support upon the first said means.

37. In a machine for the purpose set forth, the combination of a mantle support, a conveyer for the support, means for removing the support from the conveyer and for replacing it thereon, a shaping burner, means for lifting the support from the first said means and placing the mantle supported thereby over the burner and for replacing the support upon the first said means, and means whereby movement may be imparted to the mantle while being shaped.

38. In a machine for the purpose set forth, the combination of a plurality of mantle supports, a conveyer for the supports, means for advancing the conveyer, a shaping burner, means for successively removing the supports from the conveyer and holding them adjacent the burner, means for removing the supports from the last said means and conveying the mantles to the burner, the last said means being adapted to replace the support upon the second said means, and means for operating the second said means to replace the support upon the conveyer.

39. In a machine for the purpose set forth, the combination of a plurality of mantle supports, a conveyer for the supports, a shaper, means operatively related to the conveyer for successively removing the supports therefrom and placing the mantles adjacent the shaper, means for intermittently moving the first said means whereby the mantles will be held adjacent the shaper during the interval of rest of the mantle removing means, and means for removing the supports from the first said means and conveying the mantles to the shaper, the last said means being also adapted to replace the support upon the first said means, and the first said means being also adapted to replace the support upon the first said conveyer.

40. In a machine for the purpose set forth, the combination of a plurality of mantle supports, a shaper, means for receiving the supports, and conveying them adjacent the shaper, means for interrupting the movement of the first said means for holding the mantles adjacent the shaper, means for removing the supports from the first said means during its interval of rest and for placing the mantles in engagement with the shaper, the last said means being adapted to replace the supports upon the first said means after the mantles have been shaped, and means for finally removing the supports from the first said means.

41. In a machine for the purpose set forth, the combination of a mantle conveyer, means for removing the cotton from the mantles, means for removing the mantles from the conveyer after the cotton has been removed therefrom and for replacing them upon the conveyer, and means for shaping the mantles before being replaced upon the conveyer.

42. In a machine for the purpose set forth, the combination of a mantle conveyer, means for removing the mantles from the conveyer and for replacing them thereon, means for removing the cotton before the mantles are replaced, means for again removing the mantles from the conveyer and for replacing them, and means for shaping the mantles before they are replaced the second time.

43. In a machine for the purpose set forth, the combination of a mantle conveyer, a burner, means for subjecting the mantles to the burner for burning out the cotton, a shaper, and means for removing the mantles from the conveyer, subjecting them to the action of the shaper after the cotton has been removed, and finally replacing them upon the conveyer.

44. In a machine for the purpose set forth, the combination of a mantle conveyer, a burner, means for removing the mantles from the conveyer, subjecting them to the burner for removing the cotton, and finally replacing them upon the conveyer, a shaping burner, and means for again removing the mantles from the conveyer, subjecting them to the shaping burner and finally replacing them on the conveyer.

45. In a machine for the purpose set forth, the combination of a mantle conveyer, a burner, means for removing the mantles from the conveyer, subjecting them to the burner for removing the cotton, and finally replacing them upon the conveyer, a shaping burner, means for again removing the mantles from the conveyer, subjecting them to the shaping burner and finally replacing them on the conveyer, and means for intermittently moving the conveyer and the mantle removing means.

46. In a machine for the purpose set forth, the combination of a mantle conveyer, spaced burners directed toward each other, means for removing the mantles from the conveyer, placing them between the burners for removing the cotton therefrom, and finally replacing them on the conveyer, means for advancing the replaced mantles, a shaper, and means for again removing the mantles from the conveyer, submitting them to the action of the shaper and finally replacing them upon the conveyer.

47. In a machine for the purpose set forth, the combination of a mantle conveyer, spaced burners directed toward each other, means for removing the mantles from the conveyer, placing them between the burners for removing the cotton therefrom, and finally replacing them upon the conveyer, means for advancing the replaced mantles, a shaping burner, and means for again removing the mantles from the conveyer, placing them over the shaping burner, and finally replacing them upon the conveyer.

48. In a machine for the purpose set forth, the combination of a mantle conveyer, spaced burners directed toward each other, means for removing the mantles from the conveyer, placing them between the burners for removing the cotton therefrom, and finally replacing them upon the conveyer, means for advancing the replaced mantles, a shaping burner, means for again removing the mantles from the conveyer, placing them over the shaping burner and finally replacing them upon the conveyer, and means for reciprocating the mantles when in position over the shaping burner.

49. In a machine for the purpose set forth, the combination of a mantle conveyer, spaced burners directed toward each other, means for removing the mantles from the conveyer, placing them between the burners for removing the cotton therefrom, and finally replacing them upon the conveyer, means for advancing the replaced mantles, a shaping burner, means for again removing the mantles from the conveyer, placing them adjacent the shaping burner and finally replacing them upon the conveyer, and counterbalanced manually operated means for removing the mantles from the last said means, placing them over the shaping burner, reciprocating the mantles when in position over the burner and replacing them upon the last said means.

50. In a machine for the purpose set forth, the combination of a mantle conveyer, a burner, means for removing the mantles from the conveyer, subjecting them to the action of the burner and then replacing them upon the conveyer, means for advancing the conveyer, and means operatively related to the conveyer operating means for operating the mantle removing means.

51. In a machine for the purpose set forth, the combination of a mantle conveyer, means for intermittently moving the conveyer, a burner, means operatively related to the conveyer moving means for removing the mantles from the conveyer and subjecting them to the action of the burner, and means also operatively related to the conveyer moving means for replacing the mantles upon the conveyer.

52. In a machine for the purpose set forth, the combination of a mantle conveyer, means for intermittently moving the conveyer, a burner, means for removing the mantles from the conveyer, subjecting them to the action of the burner and replacing the mantles on the conveyer, and tappet mechanism operatively related to the conveyer operating means for intermittently operating the mantle removing means.

53. In a machine for the purpose set forth, the combination of a mantle conveyer, means adapted to advance the carrier during the movement of the advancing means in one direction, a burner, means for removing the mantles from the conveyer and subjecting them to the burner, means operatively related to the conveyer operating means and adapted to operate the second said means during the movement of the conveyer operating means in one direction, and means also operatively related to the conveyer operating means adapted to operate the mantle removing means for replacing the mantles when said conveyer operating means moves in the opposite direction.

54. In a machine for the purpose set forth, the combination of a mantle conveyer, means for intermittently advancing the conveyer, spaced burners arranged adjacent the conveyer and directed toward each other, means for removing the mantles from the conveyer, moving them between the burners and returning them to the conveyer, a guide for said removing means, and means operatively related to the conveyer advancing means for operating the mantle removing means.

55. In a machine for the purpose set forth, the combination of mantle supports, a conveyer for the supports, means for intermittently advancing the conveyer, a burner adjacent the conveyer, means for removing the supports from the conveyer to subject the mantles to the burner and replacing them upon the conveyer, said means comprising a rock shaft, lifting links operatively related to the shaft and adapted to engage the supports, and means operatively related to the conveyer operating means and the mantle support removing means for operating the latter.

56. In a machine for the purpose set forth, the combination of mantle supports, a conveyer for the supports, means for intermittently advancing the conveyer, a burner adjacent the conveyer, means for removing the supports from the conveyer, subjecting the mantles to the burner, and replacing the supports on the conveyer, said means comprising a rock shaft, arms secured thereto, lifting links connected to the arms and adapted to engage the supports, guides for the links, and means operatively related to the conveyer operating means and the mantle removing means for operating the latter.

57. In a machine for the purpose set forth, the combination of mantle supports, a conveyer for the supports, means having a forward and return movement for intermittently advancing the conveyer, a burner adjacent the conveyer, means for removing the supports from the conveyer, subjecting the mantles to the burner and replacing them upon the conveyer, said means comprising a rock shaft, arms secured thereto, lifting links depending from the arms and adapted to engage the supports, means operatively related to the conveyer moving means adapted to rock the shaft for removing the supports upon the movement of the conveyer operating means in one direction, and means also operatively related to the said conveyer operating means and adapted to rock the shaft for returning the support when the conveyer operating means moves in the opposite direction.

58. In a machine for the purpose set forth, the combination of mantle supports, a conveyer for the supports, oscillatory means for intermittently advancing the conveyer, a burner, a rock shaft, lifting links operatively related to the shaft and adapted to engage the supports, means for rocking the shaft to raise the links and supports to subject the mantle to the action of the burner when the oscillatory means moves in one direction, and means for rocking the shaft to lower the links to replace the supports upon the conveyer upon the return movement of the oscillatory means.

59. In a machine for the purpose set forth, the combination of mantle supports, a conveyer for the supports, means having a forward and backward movement for intermittently advancing the conveyer, a burner, a rock shaft, lifting links operatively related to the shaft and having seats adapted to receive the supports, said seats being normally located below the supports, means for rocking the shaft to cause the seats to engage and move the supports adjacent the burner when the conveyer operating means moves in one direction, and means for rocking the shaft to return the links to replace the support upon the conveyer when the conveyer operating means moves in the opposite direction.

60. In a machine for the purpose set forth, the combination of mantle supports, a conveyer for the supports, means having a forward and backward movement for intermittently advancing the conveyer, a burner, a rock shaft, lifting links operatively related to the shaft and having seats adapted to receive the supports, said seats being normally located below the supports, adjustable means for rocking the shaft to cause the seats to engage and move the supports adjacent the burner when the conveyer operating means moves in one direction, and means for rocking the shaft to return the links to replace the support upon the conveyer when the conveyer operating means moves in the opposite direction.

61. In a machine for the purpose set forth, the combination of mantle supports, a conveyer for the supports, means having a forward and backward movement for intermittently advancing the conveyer, a burner, a rock shaft, lifting links operatively related to the shaft and having seats adapted to receive the supports, said seats being normally located below the supports, means for rocking the shaft to cause the seats to engage and move the supports adjacent the burner when the conveyer operating means moves in one direction, means for rocking the shaft to return the links to replace the support upon the conveyer when the conveyer operating means moves in the opposite direction, and means for counterbalancing the lifting links.

62. In a machine for the purpose set forth, the combination of mantle supports, a conveyer for the supports, means for intermittently advancing the conveyer, a burner, means for removing the supports from the conveyer, subjecting the mantles to the burner and replacing the supports upon the conveyer, means operatively related to the conveyer operating means for alternately advancing and returning the support removing means, and means operatively related to the last said means for increasing the flame of the burner as the mantles approach the burner and for decreasing the flame as the mantles recede.

63. In a machine for the purpose set forth, the combination of mantle supports, a conveyer for the supports, means for intermittently advancing the conveyer, a burner, means for removing the supports from the conveyer, subjecting the mantles to the burner and replacing the supports upon the conveyer, means operatively related to the conveyer operating means for alternately advancing and returning the support removing means, and tappet mechanism for increasing the flame of the burner as the mantles approach the burner and for decreasing the flame as the mantles recede.

64. In a machine for the purpose set forth, the combination of mantle supports, a conveyer for the supports, means for intermittently advancing the conveyer, a burner, means for removing the supports from the conveyer, subjecting the mantles to the burner and replacing the supports upon the conveyer, means operatively related to the conveyer operating means for alternately advancing and returning the support removing means, and variable means operatively related to the last said means for increasing the flame of the burner as the mantles approach the burner and for decreasing the flame as the mantles recede.

65. In a machine for the purpose set forth, the combination of mantle supports, a conveyer for the supports, means for intermittently advancing the conveyer, a burner, a regulating valve for the burner, a rock shaft, means operatively related to the shaft for removing the supports from the conveyer, subjecting the mantles to the burner and replacing the supports upon the conveyer, means operatively related to the conveyer operating means for rocking the shaft to alternately advance and return the support removing means, and means for operating the valve to increase the flame of the burner when the mantles approach the burner and for decreasing the flame as the mantles recede, said means comprising a projection on the valve and a link connected by one end to the rock shaft, the other end being provided with an elongated slot to receive the projection.

66. In a machine for the purpose set forth, the combination of mantle supports, a conveyer for the supports, means for intermittently advancing the conveyer, a burner, a regulating valve for the burner, a rock shaft, means operatively related to the shaft for removing the supports from the conveyer, subjecting the mantles to the burner and replacing the supports upon the conveyer, means operatively related to the conveyer operating means for rocking the shaft to alternately advance and return the support removing means, means for operating the valve to increase the flame of the burner when the mantles approach the burner and for decreasing the flame as the mantles recede, said means comprising a projection on the valve and a link connected by one end to the rock shaft, the other end being provided with an elongated slot to receive the projection, and an adjustable member in the slot for varying the movement of the valve.

67. In a machine for the purpose set forth, the combination of mantle supports, a conveyer for the supports, means having a forward and backward movement for intermittently advancing the conveyer, lifting means for the support, a bell crank lever, a connection between the lever and the lifting means, means operatively related to the conveyer advancing means adapted to engage the lever and move the same to raise the supports from the conveyer when the advancing means moves in one direction, and means also operatively related to the advancing means adapted to engage and move the lever in the opposite direction to replace the supports upon the return movement of said advancing means.

68. In a machine for the purpose set forth, the combination of mantle supports, a conveyer for the supports, means having a forward and backward movement for intermittently advancing the conveyer, lifting means for the support, a bell crank lever, a connection between the lever and the lifting means, means operatively related to the conveyer advancing means adapted to engage the lever and move the same to raise the supports from the conveyer when the advancing means moves in one direction, means for retaining the lifting means in its elevated position, and means also operatively related to the advancing means adapted to engage and move the lever in the opposite direction to replace the supports upon the return movement of said advancing means.

69. In a machine for the purpose set forth, the combination of mantle supports, an endless conveyer for the supports, an oscillating drum, means for oscillating the drum, means for limiting the movements of the drum, means operatively related to the drum for intermittently advancing the conveyer, and means also operatively related to the drum for removing the supports from the conveyer and replacing them thereon.

70. In a machine for the purpose set forth, the combination of mantle supports, an endless conveyer for the supports, an oscillating drum, means for oscillating the drum, means for limiting the movements of the drum, means for regulating the speed of the drum, means operatively related to the drum for intermittently advancing the conveyer, and means also operatively related to the drum for removing the supports from the conveyer and replacing them thereon.

71. In a machine for the purpose set forth, the combination of mantle supports, an endless conveyer for the supports, an oscillating drum, means for oscillating the drum, a flexible connection between the drum and its operating means, means for limiting the movements of the drum, means operatively related to the drum for intermittently advancing the conveyer, and means also operatively related to the drum for removing the supports from the conveyer and replacing them thereon.

72. In a machine for the purpose set forth, the combination of mantle supports, an endless conveyer for the supports, an oscillating drum, a piston, an operative connection between the piston and the drum, means for reciprocating the piston to oscillate the drum, means operatively related to the drum for advancing the carrier when the drum is moved in one direction, and means also operatively related to the said movement of the drum, adapted to remove the supports from the conveyer and replace them thereon.

73. In a machine for the purpose set forth, the combination of a conveyer comprising an endless sprocket chain, a sprocket wheel engaged by the chain, lateral projections extending from the sprocket, a drum, means for rotating said drum in a forward and backward direction, a bar pivotally connected to the drum and adapted to successively engage the projections on the sprocket to rotate the same and intermittently advance the conveyer upon the forward movement of the drum, and means for supporting the free end of the bar.

74. In a machine for the purpose set forth, the combination of a conveyer comprising an endless sprocket chain, a sprocket wheel engaged by the chain, lateral projections extending from the sprocket, a drum, means for rotating said drum in a forward and backward direction, a bar pivotally connected to the drum, said bar being provided with a shoulder adjacent one end, adapted to successively engage the projections to rotate the sprocket wheel to intermittently advance the conveyer upon the forward movement of the drum, means for supporting the free end of the bar, and means for preventing the next advancing projection from disengaging the shoulder from the pin.

75. In a machine for the purpose set forth, the combination of a conveyer comprising an endless sprocket chain, a sprocket wheel engaged by the chain, lateral projections extending from the sprocket, a drum, means for rotating said drum in a forward and backward direction, a bar pivotally connected to the drum, said bar being provided with a shoulder adjacent one end, adapted to successively engage the projections to rotate the sprocket wheel to intermittently advance the conveyer upon the forward movement of the drum, means for supporting the free end of the bar, said bar being provided with an inclined face and a recess adjacent the shoulder, said recess being adapted to receive the next advancing projection to prevent the same from engaging the bar to disengage the shoulder and the first projection, and said inclined face being adapted to raise the end of the bar as the drum rotates in the opposite direction.

76. In a machine for the purpose set forth, the combination of mantle supports, a conveyer for the supports, means for removing the supports from the conveyer and for replacing them, means for advancing the conveyer, a tank, means for receiving the supports from the conveyer, means for operating the last said means for dipping the mantles in the tank and for returning the support to the conveyer, and separate means operated by the conveyer advancing means for moving the first said means and the dipping means.

77. In a machine for the purpose set forth, the combination of mantle supports, a conveyer for the supports comprising upper and lower runs, a guide adjacent the lower run for intermittently advancing the conveyer, means operatively related to the conveyer operating means for removing the supports from the upper run and placing them upon the guide to be advanced by the lower run, said guide being provided with an aperture, a tank, means adjacent the aperture adapted to receive the supports therethrough, and means operatively related to the conveyer operating means for dipping the mantles into the tank and for returning the supports to the guide.

78. In a machine for the purpose set forth, the combination of mantle supports, a conveyer for the supports comprising upper and lower runs, a guide adjacent the lower run for intermittently advancing the conveyer, means operatively related to the conveyer operating means for removing the supports from the upper run and placing them upon the guide to be advanced by the lower run, said guide being provided with an aperture, a tank, brackets beneath the guide adjacent the aperture adapted to receive the supports therethrough, and means operatively related to the conveyer operating means for dipping the mantles into the tank and for returning the supports to the guide.

79. In a machine for the purpose set forth, the combination of mantle supports, a conveyer for the supports comprising upper and lower runs, a guide adjacent the lower run for intermittently advancing the conveyer, means operatively related to the conveyer operating means for removing the supports from the upper run and placing them upon the guide to be advanced by the lower run, said guide being provided with an aperture, a tank, brackets beneath the guide adjacent the aperture adapted to receive the supports therethrough, means operatively related to the conveyer operating means for dipping the mantles into the tank and for returning the supports to be advanced by the guide, and means for limiting the return movement of the brackets.

80. In a machine for the purpose set forth, the combination of a conveyer, a drum, a cylinder, a piston rod, a flexible member surrounding the drum, means for securing the member to the drum, the ends of said flexible member being crossed and secured to the piston rod, means for reciprocating the piston to move the drum forward and backward, and means operatively related to the drum and adapted to intermittently advance the conveyer when the drum is moved in its forward direction.

81. In a machine for the purpose set forth, the combination of a conveyer, a drum having parallel peripheral grooves and a transverse groove forming a communication between the grooves, a cylinder, a piston rod, a flexible member, said flexible member being seated in one of the grooves and extending into the other groove through the transverse groove, means for securing said member in position, the ends of the member being crossed and secured to the piston rod, means for reciprocating the piston to move the drum forward and backward, and means operatively related to the drum adapted to intermittently advance the conveyer when the drum is moved in its forward direction.

82. In a machine for the purpose set forth, the combination of a conveyer, a cylinder having an inlet port at each end, and a source of fluid supply, a valve for controlling and directing the fluid into the cylinder for moving the piston, means for operating the valve to direct the fluid in one direction, means for locking said valve open, means for releasing the valve, and an operative connection between the piston and the conveyer for intermittently advancing the latter.

83. In a machine for the purpose set forth, the combination of a conveyer, a cylinder having an inlet port at each end, and a source of fluid supply, a valve for controlling and directing the fluid into the cylinder for moving the piston, means for operating the valve to direct the fluid in one direction, means for locking said valve open, means operatively related to the piston for releasing the valve, and an operative connection between the piston and the conveyer for intermittently advancing the latter.

84. In a machine for the purpose set forth, the combination of a conveyer, a cylinder having an inlet port at each end, and a source of fluid supply, a valve for controlling and directing the fluid into the cylinder for moving the piston, means for operating the valve to direct the fluid in one direction, means for locking said valve open, means on the piston adapted to trip the locking means when the piston has substantially reached the limit of its movement in one direction for releasing the valve to cause the piston to move in the opposite direction, and an operative connection between the piston and the conveyer for intermittently advancing the latter.

85. In a machine for the purpose set forth, the combination of a conveyer, a cylinder having an inlet port at both ends, and a source of fluid supply, a valve for controlling and directing the fluid into the cylinder for moving the piston in one direction, means for normally directing the fluid into one end of the cylinder, means for operating the valve for directing the fluid into the other end of the cylinder, a latch adapted to lock the valve in the last said position, a projection on the piston, for tripping the latch when the piston substantially reaches the limit of its movement to release the valve, means for automatically returning the valve to its normal position to reverse the direction of movement of the piston, and means operatively related to the piston adapted to intermittently move the conveyer during the first movement of the piston.

86. In a machine for the purpose set forth, the combination of a conveyer, a cylinder having an inlet port at both ends, and a source of fluid supply, a valve for controlling and directing the fluid into the cylinder for moving the piston in one direction, means for normally directing the fluid into one end of the cylinder, means for operating the valve for directing the fluid into the other end of the cylinder, a latch adapted to lock the valve in the last said position, a projection on the piston, a pivoted member adapted to be engaged by the projection, for tripping the latch when the piston substantially reaches the limit of its movement to release the valve, means for automatically returning the valve to its normal position to reverse the direction of movement of the piston, and means operatively related to the piston adapted to intermittently move the conveyer during the first movement of the piston.

87. In a machine for the purpose set forth, the combination of a conveyer, a cylinder having an inlet port at both ends, and a source of fluid supply, a valve for controlling and directing the fluid into the cylinder for moving the piston in one direction, means for normally directing the fluid into one end of the cylinder, means for operating the valve for directing the fluid into the other end of the cylinder, a latch adapted to lock the valve in the last said position, a projection on the piston, a pivoted member adapted to be engaged by the projection, for tripping the latch when the piston substantially reaches the limit of its movement to release the valve, means for automatically returning the valve to its normal position to reverse the direction of movement of the piston, a spring for returning the latch to its normal position, a spring for also returning the pivoted member to its normal position, and means operatively related to the piston adapted to intermittently move the conveyer during the first movement of the piston.

88. In a machine for the purpose set forth, the combination of a conveyer, a cylinder provided with an inlet port at each end and having a source of fluid supply, a valve casing having a supply and an exhaust port for each end of the cylinder, supply and exhaust ports in the valve adapted to register with the respective ports, means for operating the valve, means for varying the size of the exhaust ports, a piston movable in the cylinder, and means operatively related to the movement of the piston for intermittently advancing the conveyer.

89. In a machine for the purpose set forth, the combination of a conveyer, a cylinder provided with an inlet port at each end and having a source of fluid supply, a valve casing having a supply and an exhaust port for each end of the cylinder, supply and exhaust ports in the valve adapted to register with the respective ports, means for operating the valve, adjustable means operatively related to the exhaust ports for varying the size of the ports to regulate the speed of the piston, a piston movable in the cylinder, and means operatively related to the movement of the piston for intermittently advancing the conveyer.

90. In a machine for the purpose set forth, the combination of mantle supports, a conveyer for the supports, a piston, means for reciprocating the piston, means operatively related to the movement of the piston for intermittently advancing the conveyer, a tank, means for receiving the supports from the conveyer, a member adapted to be raised by the piston, and means for shifting the weight of said member from the piston to the support receiving means to operate the latter for dipping the mantles into the tank.

91. In a machine for the purpose set forth, the combination of mantle supports, a conveyer for the supports, a piston, means for reciprocating the piston, means operatively related to the movement of the piston for intermittently advancing the conveyer, a tank, means for receiving the supports from the conveyer, a member adapted to be raised by the piston, means for shifting the weight of said member from the piston to the support receiving means to operate the latter for dipping the mantles into the tank, means for releasing the member from the support receiving means, and means for returning the said support receiving means to its normal position.

92. In a machine for the purpose set forth, the combination of mantle supports, a conveyer for the supports, a piston, means for reciprocating the piston, means operatively related to the movement of the piston for intermittently advancing the conveyer, a tank, means for receiving the supports from the conveyer, a member adapted to be raised by the piston, means for shifting the weight of said member from the piston to the support receiving means to operate the latter for dipping the mantles into the tank, means for releasing the member from the support receiving means, means for returning the said support receiving means to its normal position, and means for imparting a uniform movement to the support receiving means.

93. In a machine for the purpose set forth, the combination of mantle supports, a conveyer for the supports, means for intermittently advancing the conveyer, a tank, means for receiving the supports from the conveyer, a weighted arm for normally holding the last said means adjacent the conveyer, a member adapted to be raised by the conveyer operating means, means for releasing the member from the last said means and shifting the weight thereof to the arm for overcoming the weight of the latter to cause the support receiving means to dip the mantles into the tank, and means for removing the additional weight from the arm to permit the weight on the arm to return the support receiving means to their normal position.

94. In a machine for the purpose set forth, the combination of mantle supports, a conveyer for the supports, means for intermittently advancing the conveyer, a tank, means for receiving the supports from the conveyer, a weighted arm for normally holding the last said means adjacent the conveyer, a member adapted to be raised by the conveyer operating means, means for releasing the member from the last said means, means for locking the member to the arm for overcoming the weight of the latter to cause the support receiving means to dip the mantles in the tank, and means for unlocking the member from the arm to permit the weight on the arm to return the support receiving means to their normal position.

95. In a machine for the purpose set forth, the combination of mantle supports, a conveyer for the supports, means for intermittently advancing the conveyer, a tank, means for receiving the supports from the conveyer, a weighted arm operatively related to the support receiving means for holding them in position adjacent the conveyer, a guide on the arm, a member movable through the guide, said member being adapted to be moved through the guide by the conveyer operating means, means for locking the member to the guide and for removing the weight thereof from the conveyer operating means, whereby the weight of said member will be transferred to the arm to overcome the weight thereon to lower the mantles into the tank, and means on the arm adapted to engage the member when the arm has substantially reached the limit of its movement, for unlocking the member to permit the weight on the arm to raise the mantle supports to their normal position.

96. In a machine for the purpose set forth, the combination of mantle supports, a conveyer for the supports, means for intermittently advancing the conveyer, a tank, means for receiving the supports from the conveyer, a weighted arm operatively related to the support receiving means for holding them in position adjacent the conveyer, a guide on the arm, a member movable through the guide, said member being adapted to be moved through the guide by the conveyer operating means, a shoulder on the member, a spring adapted to engage the guide for moving the shoulder into engagement with the guide for locking the member to the arm and for removing the weight thereof from the conveyer operating means, whereby the weight of said member will be transferred to the arm to overcome the weight thereon to lower the mantles into the tank, and means on the arm adapted to engage the member when the arm has substantially reached the limit of its movement to move the member against the tension of the spring for unlocking the member to permit the weight on the arm to raise the mantle supports to their normal position.

97. In a machine for the purpose set forth, the combination of mantle supports, a conveyer for the supports, means for advancing the conveyer, a tank, support receiving means, means for holding the last said means in position, a weight, means for connecting the weight to the said holding means to overcome said means and move the support receiving means to dip the mantles into the tank, and means for releasing the weight to permit the support receiving means to return to their normal position.

98. In a machine for the purpose set forth, the combination of mantle supports, a conveyer for the supports, means for advancing the conveyer, a tank, support receiving means, means for holding the last said means in position, a weight, means for connecting the weight to the said holding means to overcome said means and move the support receiving means to dip the mantles into the tank, means for releasing the weight to permit the support receiving means to return to their normal position, means for imparting a uniform movement to the support receiving means, and means for limiting the movement thereof.

99. In a machine for the purpose set forth, the combination of mantle supports, a conveyer for the supports, means for intermittently advancing the conveyer, a weighted arm, a mantle support receiving means, a link comprising spaced members, one of the members being provided with an aperture adjacent the ends, the other member having a slot adjacent the ends adapted to register with the apertures, pivot pins secured to the mantle support receiving means and the arm, and adapted to enter the aperture and slot adjacent the respective ends of the link, said link being adapted to prevent a rotary movement of the support receiving means but permit the link to be deflected to prevent straining of the parts, and means for overcoming the weight of the arm for lowering the support receiving means.

100. In a machine for the purpose set forth, the combination of mantle supports, a conveyer for the supports, a cylinder having an inlet port at both ends, a piston, a valve for directing the fluid into one end of the cylinder for moving the piston, means operatively related to the piston for moving the conveyer, means for operating the valve to move the piston, means for locking the valve in position, mantle support receiving means, a weighted arm operatively connected to the last said means for holding the same in position, a supplemental weight, a tank, means on the piston adapted to raise the weight, means for placing the weight on the arm to overcome the weight thereon to lower the support receiving means for dipping the mantles in the tank, and means adapted to be engaged by the weight lifting means for tripping the lock to release the valve.

101. In a machine for the purpose set forth, the combination of mantle supports, a conveyer for the supports, a cylinder having an inlet port at both ends, a piston, a valve for directing the fluid into one end of the cylinder for moving the piston, means operatively related to the piston for moving the conveyer, means for operating the valve to move the piston, means for locking the valve in position, mantle support receiving means, a weighted arm operatively connected to the last said means for holding the same in position, a supplemental weight, a tank, means on the piston adapted to raise the weight, means for placing the weight on the arm to overcome the weight thereon to lower the support receiving means for dipping the mantles in the tank, means adapted to be engaged by the weight lifting means for tripping the lock to release the valve, means for returning the valve to its normal position, and means for releasing the supplemental weight to permit the weight on the arm to return the support receiving means to its normal position.

102. In a machine for the purpose set forth, the combination of mantle supports, a conveyer for the supports, means for intermittently advancing the conveyer, support receiving means, a tank, a cover for the tank, means for removing the cover, means for lowering the supports to dip the mantles in the tank, and means operatively related to the conveyer advancing means for operating the lowering means and the cover removing means.

103. In a machine for the purpose set forth, the combination of mantle supports, a conveyer for the supports, means for intermittently advancing the conveyer, support receiving means, a tank, a cover for the tank, means for removing the cover, means for lowering the supports to dip the mantles in the tank, means operatively related to the conveyer advancing means for operating the lowering means and the cover removing means, and means operatively related to the support receiving operating means for returning the cover.

104. In a machine for the purpose set forth, the combination of mantle supports, a conveyer, means for intermittently advancing the conveyer, means for removing the supports from the conveyer, a tank, a cover for the tank, a rock shaft, a weight on the shaft, a connection between the shaft and the cover, means operatively related to the conveyer operating means for moving the weight over the center to rock the shaft to open the tank, means for lowering the mantles into the tank and returning them to the conveyer, and means for moving the weight to the other side of the center to rock the shaft to close the tank.

105. In a machine for the purpose set forth, the combination of mantle supports, a conveyer, means for intermittently advancing the conveyer, means for removing the supports from the conveyer, a tank, a cover for the tank, a rock shaft, a weight on the shaft, a connection between the shaft and the cover, means operatively related to the conveyer operating means for moving the weight over the center to rock the shaft to open the tank, means for lowering the mantles into the tank and returning them to the conveyer, means for moving the weight to the other side of the center to rock the shaft to close the tank, and means for limiting the movement of the shaft in both of its directions.

106. In a machine for the purpose set forth, the combination of mantle supports, a conveyer for the supports, means for advancing the conveyer, support receiving means, a weighted arm for holding the receiving means in position, a tank, a cover for the tank, a shaft, connections between the shaft and cover, a weight on the shaft, means operatively related to the conveyer operating means for lowering the receiving means to dip the mantles into the tank, and for moving the weight to one side of the center to remove the cover, an arm on the shaft, a rod pivotally connected to the arm, and interengaging means on the weighted arm and the rod for moving the weight to the other side of the center for closing the tank.

107. In a machine for the purpose set forth, the combination of mantle supports, a conveyer for the supports, means for advancing the conveyer, support receiving means, a weighted arm for holding the receiving means in position, a tank, a cover for the tank, a shaft, connections between the shaft and cover, a weight on the shaft, means operatively related to the conveyer operating means for lowering the receiving means to dip the mantles into the tank, and for moving the weight to one side of the center to remove the cover, an arm on the shaft, a rod pivotally connected to the arm, a swiveled nut on the weighted arm, and through which the rod passes, and a projection on the rod adapted to be engaged by the nut to move the weight on the other side of the center to close the tank.

108. In a machine for the purpose set forth, the combination of a mantle support, a conveyer for the support, means for removing the mantles from the conveyer and returning the same, means for removing the cotton from the mantles while the latter are removed from the conveyer, means for again removing the mantles and replacing them, means for shaping the mantles when thus removed, means for removing the mantles from the conveyer a third time and replacing them, and for dipping the mantles when thus removed, and means for moving the conveyer to advance the support to the respective removing means.

109. In a machine for the purpose set forth, the combination of a mantle support, an endless conveyer for the support, means for removing the mantles from the conveyer and returning the same, means for removing the cotton from the mantles while the latter are removed from the conveyer, means for again removing the mantles and replacing them, means for shaping the mantles when thus removed, means for removing the mantles from the conveyer a third time and replacing them, and for dipping the mantles when thus removed, and means for intermittently moving the conveyer to advance the support to the respective removing means.

110. In a machine for the purpose set forth, the combination of a mantle support, an endless conveyer for the support comprising two runs, means for removing the mantles from one of the runs and for replacing them thereon, means for burning out the cotton while the mantles are removed from the conveyer, means for again removing the mantles from one of the runs and for placing them adjacent the other run, means for shaping the mantles while removed from the conveyor after the cotton has been removed, means for removing the mantles a third time and for replacing them, means for dipping the mantles while thus removed, and means for intermittently moving the conveyer to advance the mantles successively to the respective removing means.

111. In a machine for the purpose set forth, the combination of a mantle support, an endless conveyer for the support comprising two runs, means for removing the mantles from one of the runs and for replacing them thereon, means for burning out the cotton while the mantles are removed from the conveyer, a shaping burner, means for again removing the mantles from one of the runs and for placing them adjacent the other run, means for placing the mantles over the shaping burner, while removed from the conveyer, after the cotton has been removed, means for removing the mantles a third time and for replacing them, means for dipping the mantles while thus removed, and means for intermittently moving the conveyer to advance the mantles successively to the respective removing means.

In testimony whereof I have signed my name to this specification, in the presence of two subscribing witnesses, on this 5th day of October A. D. 1906.

CLARENCE C. TRAVIS.

Witnesses:
J. H. JOCHUM, Jr.,
CHAS. H. SEEM.